(12) United States Patent
Amano

(10) Patent No.: US 9,423,599 B2
(45) Date of Patent: Aug. 23, 2016

(54) PROJECTION ZOOM LENS AND PROJECTION TYPE DISPLAY DEVICE

(71) Applicant: FUJIFILM CORPORATION, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/501,086

(22) Filed: Sep. 30, 2014

(65) Prior Publication Data

US 2015/0015967 A1    Jan. 15, 2015

Related U.S. Application Data

(63) Continuation of application No. PCT/JP2013/002173, filed on Mar. 29, 2013.

(30) Foreign Application Priority Data

Apr. 2, 2012   (JP) .................. 2012-083616

(51) Int. Cl.
*G02B 15/14* (2006.01)
*G02B 15/177* (2006.01)
*G02B 15/20* (2006.01)
*G02B 13/00* (2006.01)
(Continued)

(52) U.S. Cl.
CPC ............ *G02B 15/177* (2013.01); *G02B 13/002* (2013.01); *G02B 13/009* (2013.01); *G02B 13/04* (2013.01); *G02B 13/16* (2013.01); *G02B 15/20* (2013.01); *H04N 5/7416* (2013.01); *G02B 13/18* (2013.01)

(58) Field of Classification Search
CPC ...................................................... G02B 15/177
USPC ........................................................ 359/680
See application file for complete search history.

(56) References Cited

U.S. PATENT DOCUMENTS 7,529,036 B2   5/2009   Kawana
8,116,010 B2   2/2012   Amano
(Continued)

FOREIGN PATENT DOCUMENTS

JP     2004-77950      3/2004
JP     2004-279958    10/2004
(Continued)

OTHER PUBLICATIONS

International Search Report—PCT/JP2013/002173—Aug. 6, 2013.

*Primary Examiner* — James Jones
(74) *Attorney, Agent, or Firm* — Young & Thompson

(57) ABSTRACT

A projection zoom lens in which a magnification change operation is performed by moving three to four lens groups as moving groups, wherein a first lens group, which is a lens group on the most-magnification side, substantially consists of a moving group having a negative refractive power; a lens group on the most-reduction side is composed of a moving group having a positive refractive power; and the first lens group which is the lens group the most-magnification side substantially consists of two lenses. In this case, conditional formula (1) below is satisfied, where fw is the focal length of the entire system at the wide angle end and fm is the focal length of the lens group on the most-magnification side:

$-3.5 < fm/fw < -1.0$  (1).

This achieves miniaturization and cost reduction, and corrects various aberrations satisfactorily.

20 Claims, 13 Drawing Sheets

(51) Int. Cl.
*G02B 13/04* (2006.01)
*G02B 13/16* (2006.01)
*H04N 5/74* (2006.01)
*G02B 13/18* (2006.01)

(56) References Cited

U.S. PATENT DOCUMENTS 8,248,703 B2 8/2012 Ito
8,482,861 B2 7/2013 Tashiro

2011/0007401 A1* 1/2011 Amano ............... G02B 15/177
  359/649
2011/0176222 A1 7/2011 Ito
2012/0013994 A1 1/2012 Tashiro

FOREIGN PATENT DOCUMENTS

| | | |
|---|---|---|
| JP | 2007-271697 | 10/2007 |
| JP | 2011-017900 | 1/2011 |
| JP | 2011-53506 | 3/2011 |
| JP | 2011-145566 | 7/2011 |
| JP | 2012-22106 | 2/2012 |

* cited by examiner

EXAMPLE 1

EXAMPLE 5

PROJECTION ZOOM LENS AND PROJECTION TYPE DISPLAY DEVICE

CROSS-REFERENCE TO RELATED APPLICATIONS

This application is a Continuation of PCT International Application No. PCT/JP2013/002173 filed on Mar. 29, 2013, which claims priority under 35 U.S.C. §119(a) to Japanese Patent Application No. 2012-083616 filed on Apr. 2, 2012. Each of the above application(s) is hereby expressly incorporated by reference, in its entirety, into the present application.

BACKGROUND OF THE INVENTION

1. Technical Field

The present invention relates to a zoom lens, and particularly to a projection zoom lens which is applied to a projection type display device.

The present invention also relates to a projection type display device equipped with such a projection zoom lens.

2. Description of the Related Art

In recent years, accompanying the popularization of personal computers and the like, demand for projection type devices (projectors) is increasing and the market thereof is greatly expanding.

Light valves which optically modulate video signals and image signals to change them into optical signals are used for the projection type display device. A transmissive liquid crystal display element is a known type of light valve. Optical systems, to which the transmissive liquid crystal display elements are applied, generally employ cross dichroic prisms to compose colors. In this case, the reduction side of the projection zoom lens is made telecentric in order to improve the color composition characteristics thereof.

Further, due to increasing demand to obtain higher-definition projection images with high contrast ratios, the projection type display devices, onto which DMD's (Digital Micromirror Device: registered trademark) are mounted as the light valves, are drawing attentions in recent years. In the case that DMD's, which are reflection type light valves, are employed, there is no need for the reduction side of the projection zoom lens to be telecentric. Accordingly, a pupil position can be set near a panel, and thereby a lens part on the reduction side can be miniaturized.

Further, there is demand for the projection zoom lenses to have high zoom ratios and be capable of changing magnification, from the viewpoint of installation properties of the projection type display device.

Conventionally, the projection zoom lenses disclosed in Patent Documents 1 and 2 (Japanese Unexamined Patent Publication No. 2004-077950 and Japanese Unexamined Patent Publication No. 2007-271697) are known as those that can meet the aforementioned demands to some extent.

SUMMARY OF THE INVENTION

However, the projection zoom lens disclosed in Patent Document 1 not only has the small zoom ratio of approximately 1.3× but also has poor power balance in a third group and suffers from large field curvature. Further, the projection zoom lens disclosed in Patent Document 2 has the large zoom ratio of approximately 1.6×, but requires high cost due to the use of five lenses in the first group, which is a large diameter lens group.

The present invention has been developed in view of the above circumstances, and it is an object of the present invention to provide a compact and inexpensive projection zoom lens which is capable of correcting various aberrations satisfactorily while securing a high zoom ratio of approximately 1.5×.

It is also another object of the present invention to provide a projection type display device equipped with the projection zoom lens as described above, which is capable of displaying high-quality images with a high zoom ratio.

A projection zoom lens according to the present invention in which a magnification change operation is performed by moving three to four lens groups as moving groups, wherein a lens group on the most-magnification side substantially consists of a moving group having a negative refractive power;

a lens group on the most-reduction side substantially consists of a moving group having a positive refractive power;

the lens group on the most-magnification side substantially consists of two lenses; and conditional formula (1) below is satisfied:

$$-3.5 < fm/fw < -1.0 \qquad (1),$$ where fw: the focal length of the entire system at the wide angle end, and fm: the focal length of the lens group on the most-magnification side.

Note that in the projection zoom lens of the present invention having the configuration described above, it is desirable for the lens group on the most-magnification side to substantially consist of an aspherical surface lens having at least one aspherical surface and a biconcave lens in this order from the magnification side.

Here, the above expression "substantially consists of . . ." intends to mean that the projection zoom lens of the present invention may include lenses substantially without any refractive power; optical elements other than lenses such as aperture stops, cover glasses, and the like; lens flanges; lens barrels; imaging elements; and mechanical components such as image stabilization mechanisms, and the like; in addition to the lenses listed above. The same applies to the other expressions "substantially" described below.

Note that the surface shapes and the signs of the refractive powers of the projection zoom lenses of the present invention should be considered in paraxial regions if aspherical surfaces are included therein.

Further, it is preferable for the aforementioned aspherical surface lens to be formed of a plastic material and for the biconcave lens to be formed of a glass material.

It is desirable for the projection zoom lens of the present invention to satisfy conditional formula (2) below, where fw is the focal length of the entire system at the wide angle end and fr is the focal length of the lens group on the most-reduction side:

$$2.0 < fr/fw < 50.0 \qquad (2).$$

In the projection zoom lens of the present invention, it is desirable for the lens group on the most-reduction side to include a biconcave lens, a positive lens, and a negative lens with a concave surface toward the magnification side in this order from the magnification side.

More specifically, it is desirable for the projection zoom lens of the present invention to substantially consist of a negative first lens group, a positive second lens group and a positive third lens group in this order from the magnification side; wherein the first lens group, the second lens group and the third lens group individually move as moving groups while changing magnification; and the first lens group moves toward the reduction side, and the second lens group and the third lens group move toward the magnification side while changing magnification from the wide angle end to the telephoto end.

Alternatively, more specifically, the projection zoom lens of the present invention may substantially consist of a negative first lens group, a positive second lens group, a positive third lens group, and a positive fourth lens group in this order from the magnification side; wherein the first lens group, the second lens group, the third lens group, and the fourth group individually move as moving groups while changing magnification; and the first lens group moves toward the reduction side, and the second lens group, the third lens group, and the fourth lens group move toward the magnification side while changing magnification from the wide angle end to the telephoto end.

Note that in the case that the projection zoom lens of the present invention is of a four-group configuration as described above, it is desirable for each of the second lens group and the third lens group to substantially consist of one single lens.

Further, it is desirable for the projection zoom lens of the present invention to satisfy conditional formula (3) below, where fw is the focal length of the entire system at the wide angle end and Bfw is the back focus of the entire system at the wide angle end (an air converted length):

$$1.0 < Bfw/fw \qquad (3).$$

In the projection zoom lens of the present invention, it is desirable for a maximum height of effective rays at a lens surface of the most-reduction side to be smaller than a maximum image height on the reduction side.

The projection type display device of the present invention includes the projection zoom lens according to the present invention as described above in addition to a light source, a light valve, and an illumination optical unit which guides a light beam from the light source to the light valve, wherein the light beam from the light source is optically modulated by the light valve and is projected onto a screen by the projection zoom lens.

In the projection zoom lens of the present invention, in which a magnification change operation is performed by moving three to four lens groups as moving groups, a lens group on the most-magnification side consists of a moving group having a negative refractive power and a lens group on the most-reduction side consists of a moving group having a positive refractive power. In this case, a first lens group which is the lens group on the most-magnification side substantially consists of two lenses. In such a manner, the lens group on the most-magnification side which is likely to have a large diameter in general consists of a small number of lenses, i.e., two lenses. This enables the projection zoom lens to be formed at low cost.

Although the above configuration can obtain cost merits, there is a possibility that off-axis aberration such as distortion and the like will increase due to the reduction of the number of lenses. However, in the projection zoom lens of the present invention, the occurrence of large aberrations can be prevented in the following manner. That is, the projection zoom lens of the present invention satisfies conditional formula (1) described above. Therefore, the off-axis aberrations such as distortion and the like, which occur due to the reduction of the number of lenses, can be satisfactorily corrected. Moreover, improving the power balance of the lens group on the reduction side enables a satisfactory correction of field curvature and the like, as well.

More specifically, in the case that the value of fm/fw is less than or equal to −3.5 which is the lower limit, the power of the lens group on the most-magnification side will excessively decrease. This leads to upsizing of the lens system. In contrast, in the case that the value of fm/fw is greater than or equal to −1.0 which is the upper limit, the power of the lens group on the most-magnification side will excessively increase. This will make it difficult to correct various aberrations such as distortion and the like. In the case that conditional formula (1) is satisfied, a compact and low-cost lens system can be obtained while preventing such shortcomings and securing a high zoom ratio. Further, various aberrations, particularly off-axis aberration can be satisfactorily corrected.

In addition, in the case that the projection zoom lens of the present invention is particularly configured in such a manner that the lens group on the most-magnification side consists of an aspherical surface lens having at least one aspherical surface and a biconcave lens in this order from the magnification side, the following advantageous effects can be obtained. That is, by disposing an aspherical surface lens on the most-magnification side within the most-magnification-side lens group, off-axis aberrations, particularly distortion, will be effectively corrected. Further, by disposing a negative biconcave lens on the most-reduction side within this lens group, an appropriate negative power can be obtained as a whole and the off-axis aberrations such as astigmatism and the like will be effectively corrected.

In the case that the above aspherical surface lens in particular is a plastic lens, while the above biconcave lens is a glass lens, the following advantageous effects can be obtained. That is, such a configuration enables the aspherical surface plastic lens and the glass lens to have an aberration correction function and a necessary amount of power, respectively. Thereby, a lens system, which is less likely to be effected by thermal changes and can sufficiently exhibit aberration correction functions, can be formed. Further, forming one lens of a plastic material is advantageous from the viewpoint of productivity and cost.

Further, the projection zoom lens of the present invention satisfies conditional formula (2) described above, the following advantageous effects can be obtained. Particularly, since conditional formula (2) defines the conditions for satisfactorily correcting field curvature (particularly sagittal field curvature), it will become difficult to correct field curvature satisfactorily even when the value of fr/fw is less than or equal to 2.0 or greater than or equal to 50.0. In the case that conditional formula (2) is satisfied, the shortcomings described above will be prevented and it will be possible to correct field curvature satisfactorily.

In the projection zoom lens of the present invention, particularly in the case that the lens group on the most-reduction side includes a biconcave lens, a positive lens, and a negative lens with a concave surface toward the magnification side in this order from the magnification side, the operations and effects obtained by satisfying conditional formula (2) described above can be prominent, and further fluctuations in spherical aberration due to zooming can be reduced.

Further, particularly in the case that the projection zoom lens of the present invention is configured to substantially consist of a negative first lens group, a positive second lens group, and a positive third lens group in this order from the magnification side, wherein the first lens group, the second lens group, and the third lens group independently move as moving groups while changing magnification; and the first lens group moves toward the reduction side, and the second lens group and the third lens group move toward the magnification side while changing magnification from the wide angle end to the telephoto end, upsizing of the entire lens system can be prevented and a high zoom ratio can be secured.

Further, particularly in the case that the projection zoom lens of the present invention is configured to substantially consist of a negative first lens group, a positive second lens group, a positive third lens group, and a positive fourth lens group in this order from the magnification side, wherein the first lens group, the second lens group, the third lens group, and the fourth lens group independently move while changing magnification; and the first lens group moves toward the reduction side and the second lens group, the third lens group, and the fourth lens group move toward the magnification side while changing magnification from the wide angle end to the telephoto end, a high zoom ratio can be secured without upsizing the entire lens system.

In the projection zoom lens of the present invention of a four-group configuration as described above, in the case that each of the second lens group and the third lens group consist of one single lens, the number of lenses will be particularly reduced and cost can be reduced more effectively.

In the projection zoom lens of the present invention, particularly in the case that conditional formula (3) described above is satisfied, the following advantageous effects can be obtained. In the case that the value of Bfw/fw is less than or equal to 1.0, it will become difficult for the illumination optical system to be arranged in proximity to the projection zoom lens. However, in the case that conditional formula (3) is satisfied, such a shortcoming will be prevented and arrangement of the illumination optical system will be facilitated.

In the projection zoom lens, particularly in the case that a maximum height of effective rays at a lens surface of the most-reduction side is smaller than a maximum image height on the reduction side, a sufficient lens back can be secured and the diameters of the lenses within the lens group on the most-reduction side can be reduced.

It becomes possible for the projection type display device of the present invention to display high-definition images with a high ratio because the zoom lens of the present invention as described above is applied as a projection zoom lens.

Figure 7:
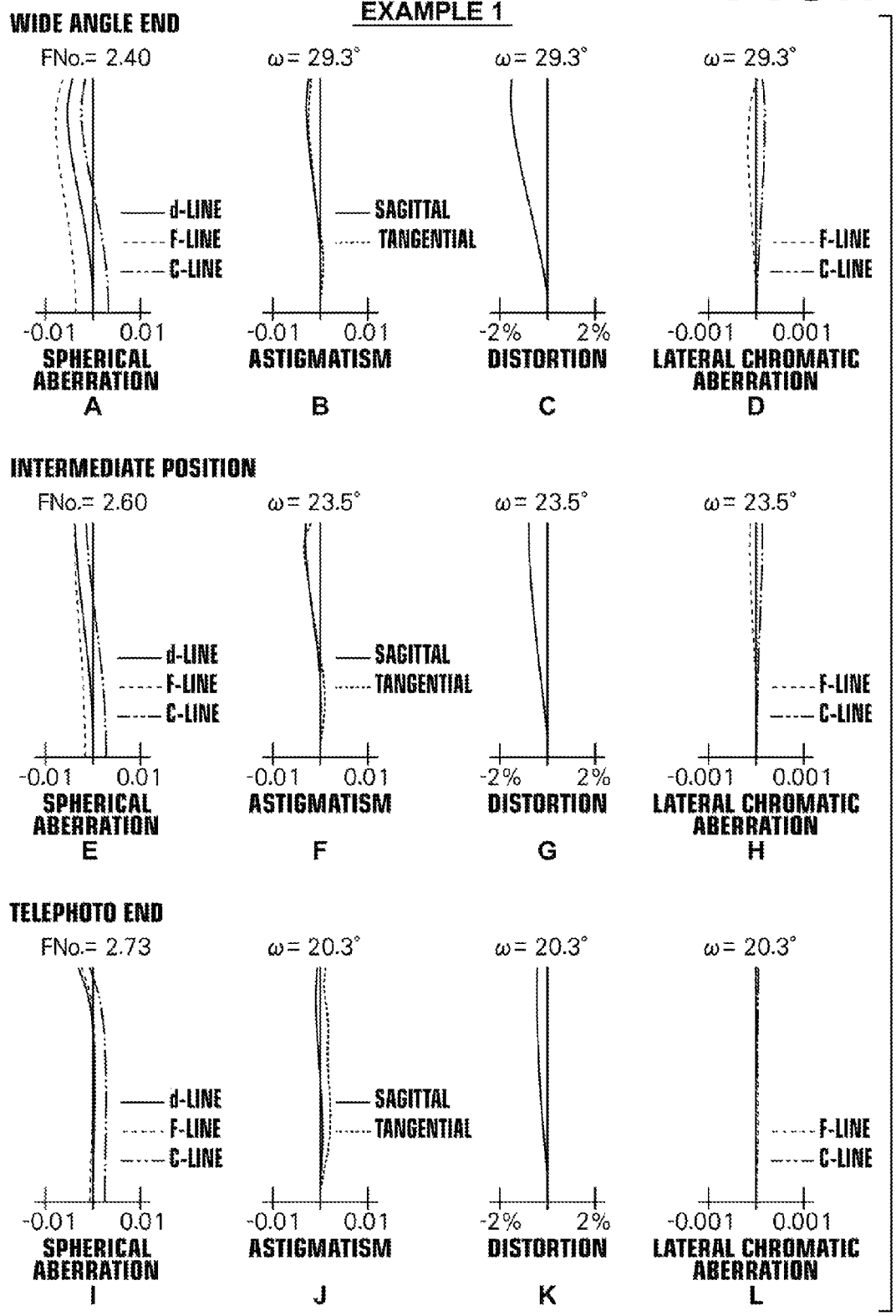

A through L of FIG. 7 respectively illustrates aberration diagrams of the projection zoom lens of Example 1 described above.

Figure 8:
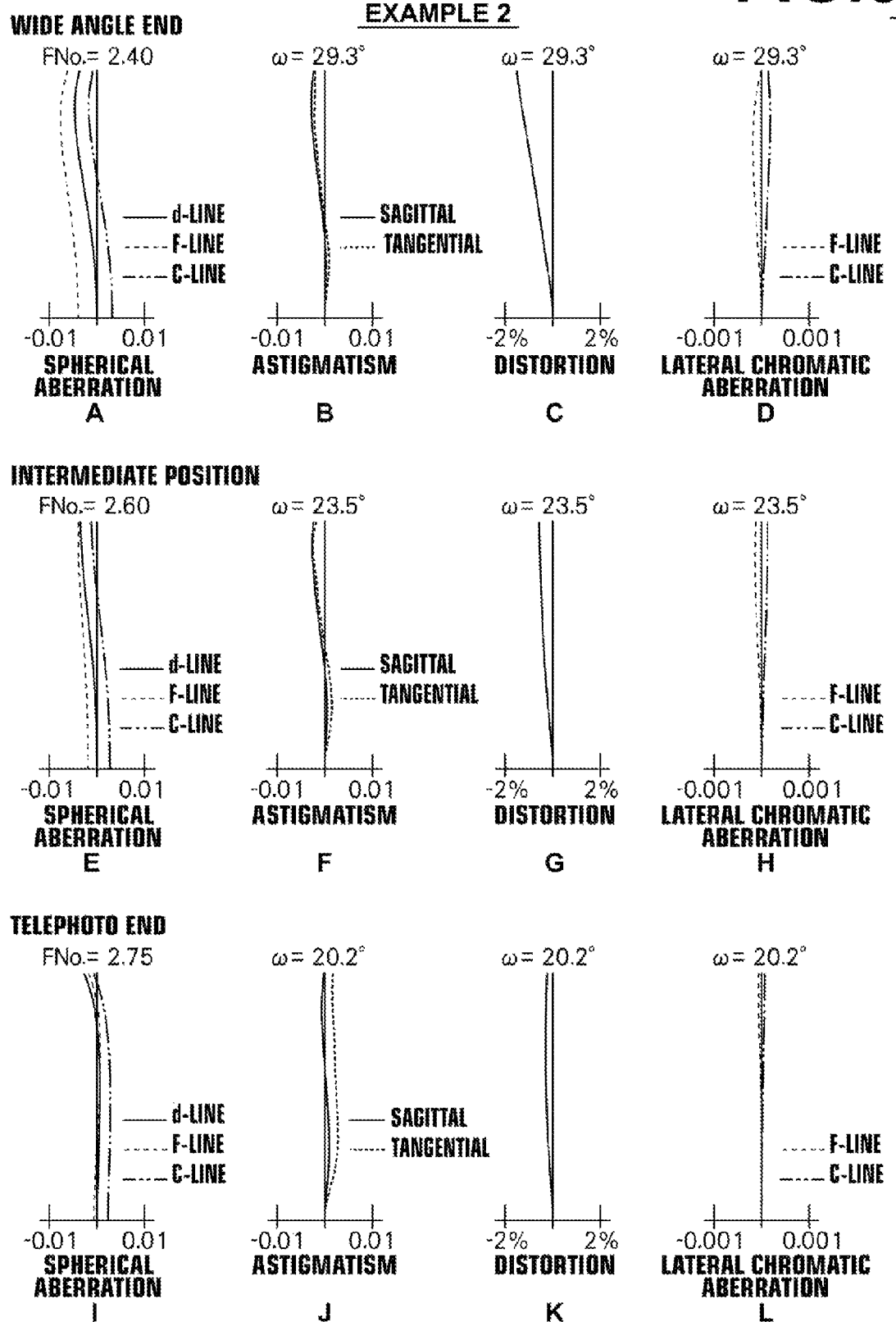

A through L of FIG. 8 respectively illustrates aberration diagrams of the projection zoom lens of Example 2 described above.

Figure 9:
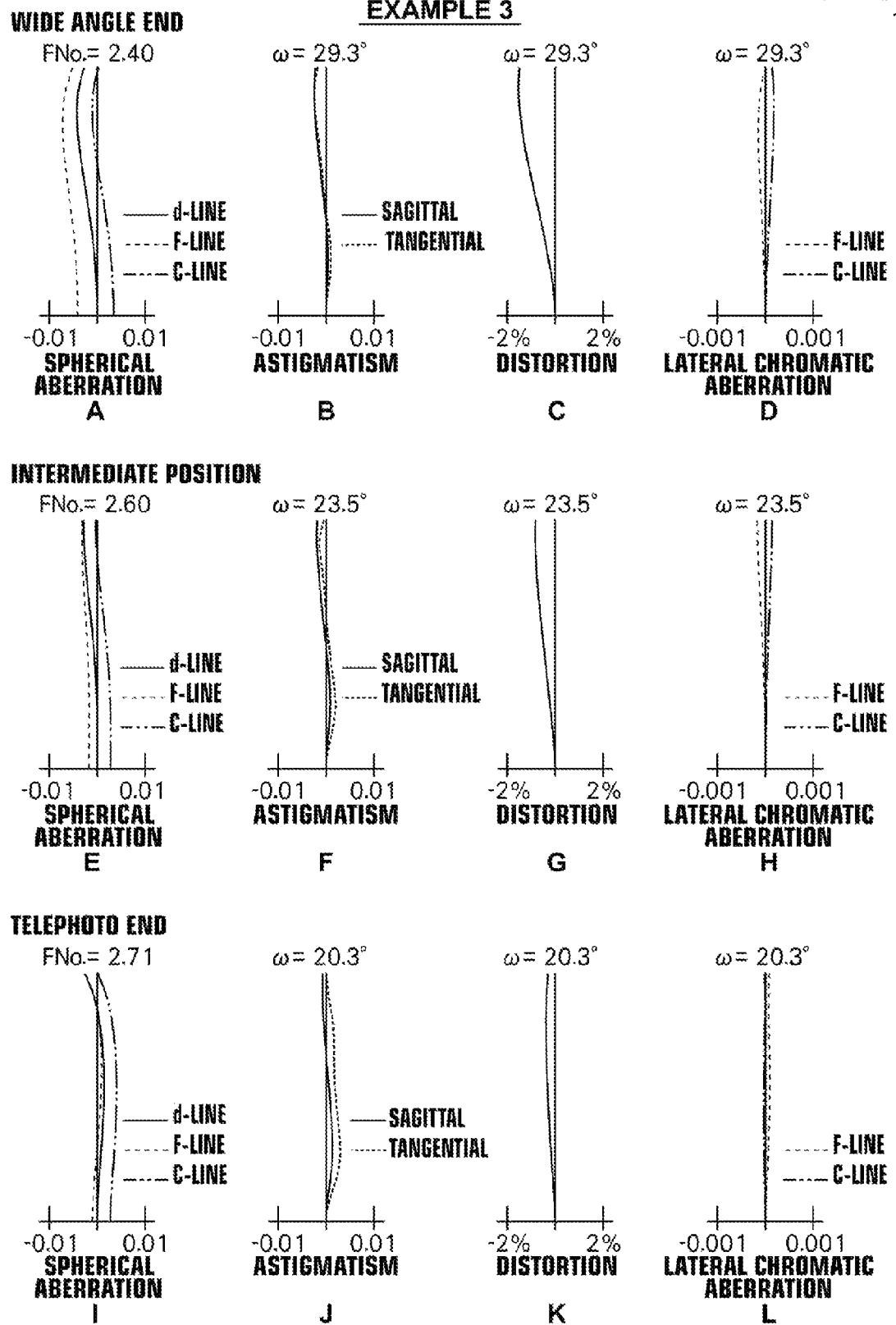

A through L of FIG. 9 respectively illustrates aberration diagrams of the projection zoom lens of Example 3 described above.

Figure 10:
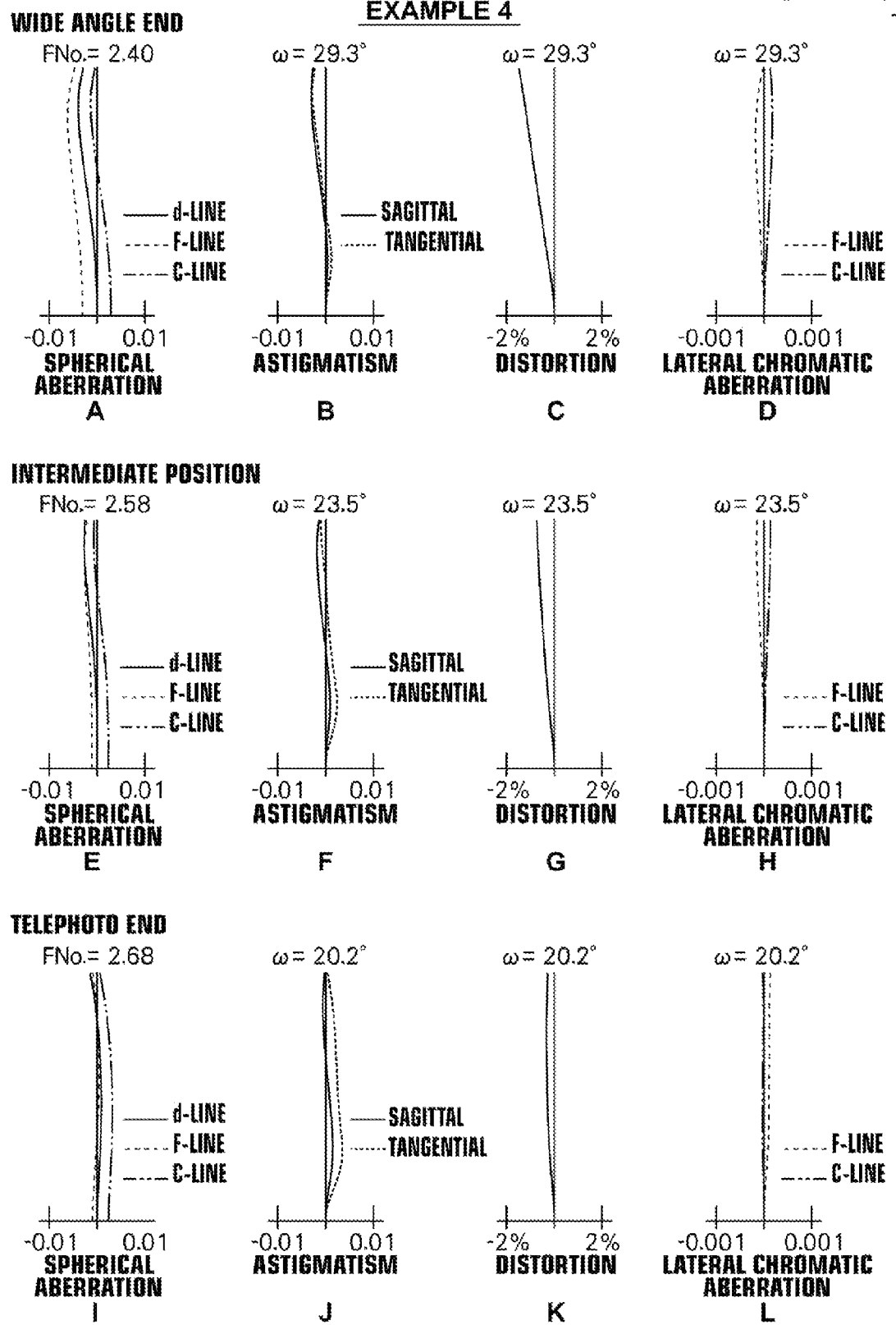

A through L of FIG. 10 respectively illustrates aberration diagrams of the projection zoom lens of Example 4 described above.

Figure 11:
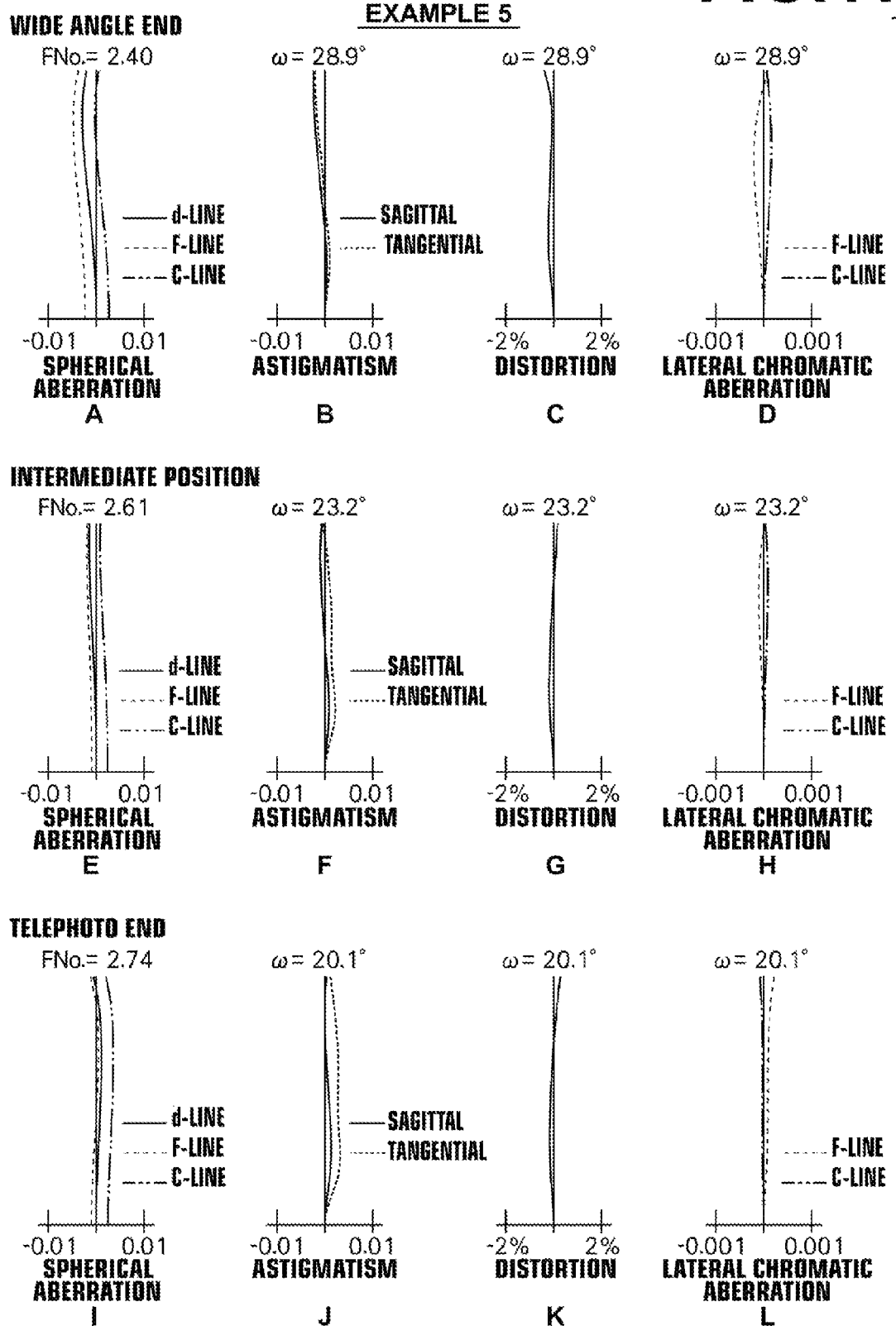

A through L of FIG. 11 respectively illustrates aberration diagrams of the projection zoom lens of Example 5 described above.

Figure 12:
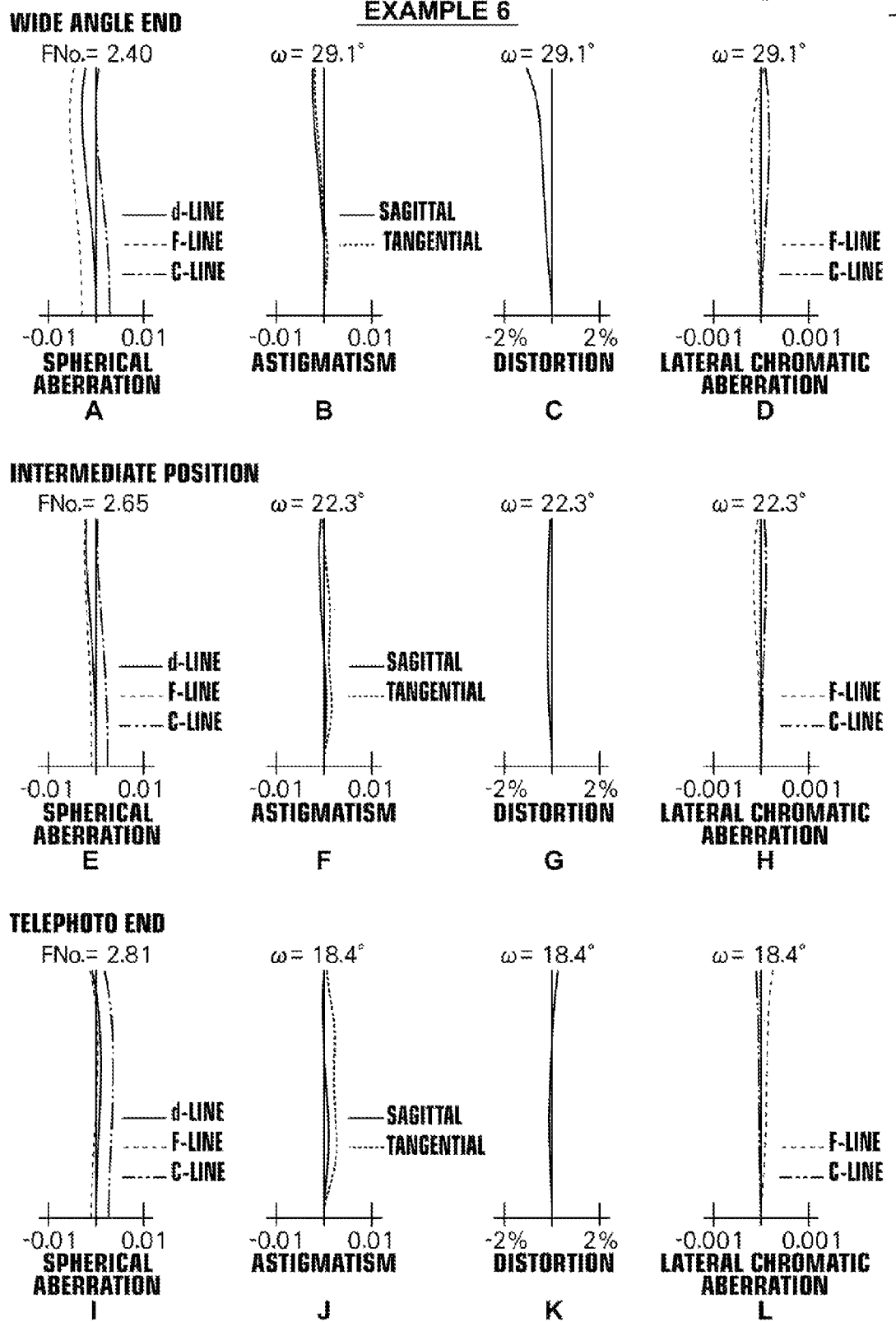

A through L of FIG. 12 respectively illustrates aberration diagrams of the projection zoom lens of Example 6 described above.

Figure 13:
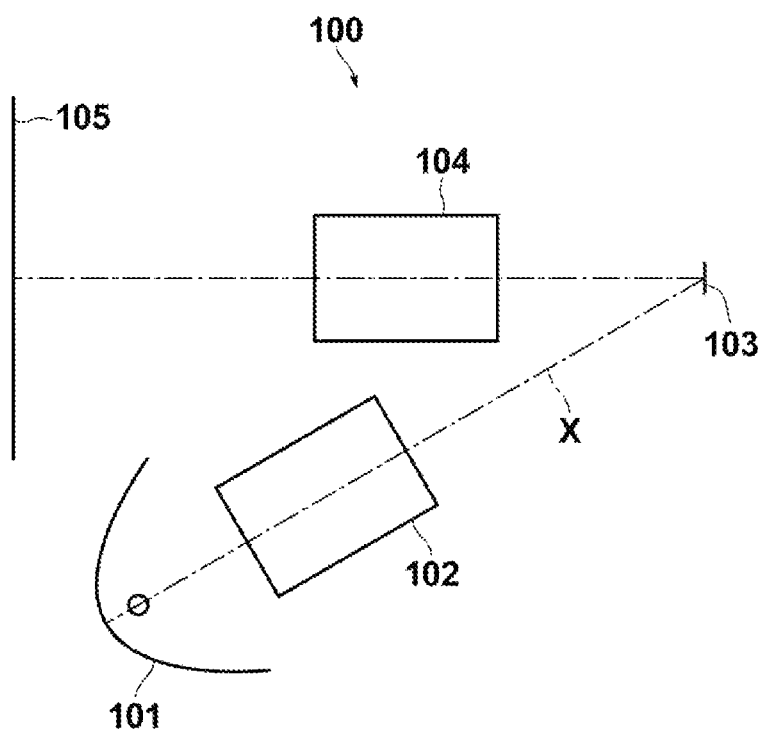

FIG. 13 is a schematic configuration diagram of a projection type display apparatus according to one embodiment of the present invention.

DESCRIPTION OF THE PREFERRED EMBODIMENTS

Hereinafter, embodiments of the present invention will be described in detail with reference to the accompanying drawings. First, the embodiments of the projection zoom lens of the present invention will be described with reference to FIG. 1 through FIG. 6.

Figure 1:
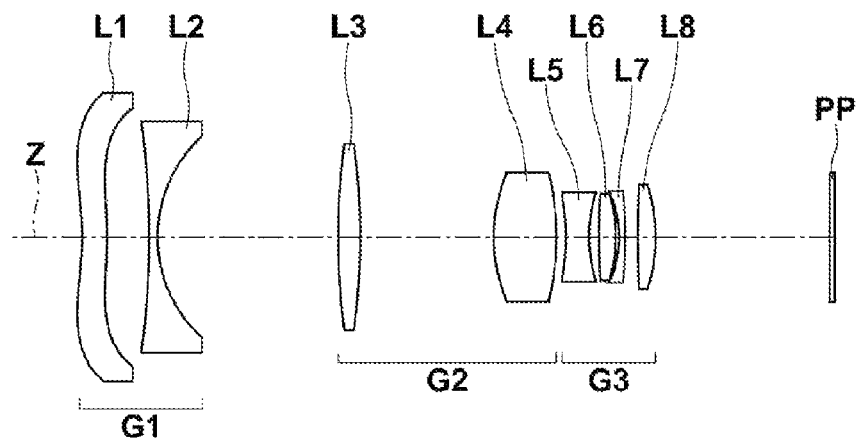
FIG. 1 is a collection of cross-sectional views of a projection zoom lens according to Example 1 of the present invention, illustrating the lens configuration thereof.
Figure 1:
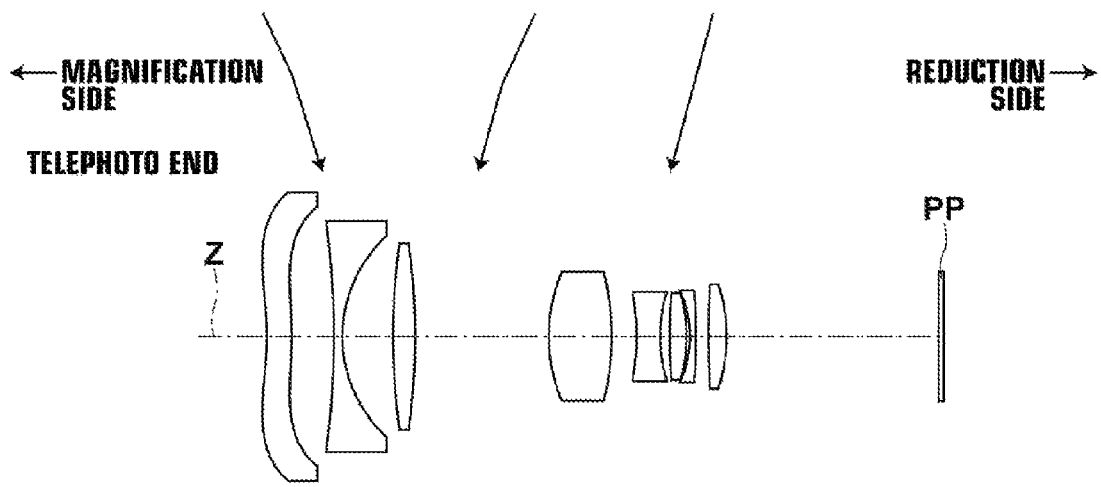

FIG. 1 is a cross-sectional view which illustrates moving positions of the lens groups at the wide angle end and the telephoto end in the case that the projection zoom lens according to one embodiment of the present invention is operated to change magnification, corresponding to the projection zoom lens of Example 1 to be described later. Each of FIG. 2 through FIG. 6 is a cross-sectional view which illustrates an example of another configuration according to the embodiment of the present invention. The projection zoom lenses of FIG. 2 through FIG. 6 correspond to those of Example 2 through Example 6 to be described later, respectively. Note that the directions of movement of the lens groups while changing magnification from the wide angle end to the telephoto end are schematically indicated by the arrows between each position.

Figure 2:
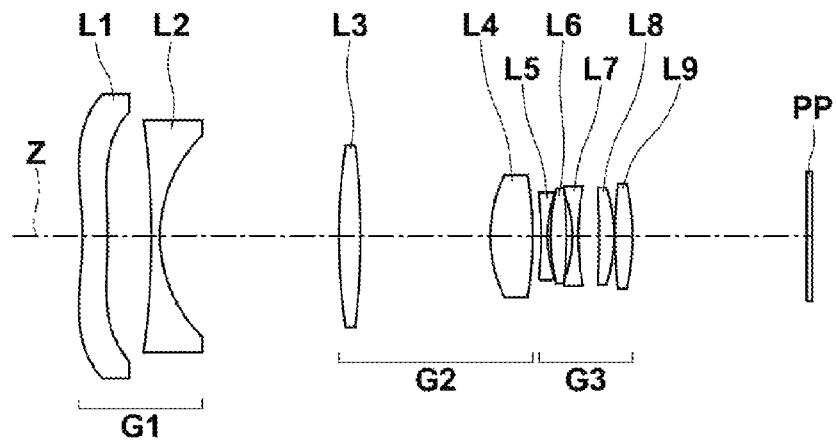
FIG. 2 is a collection of cross-sectional views of a projection zoom lens according to Example 2 of the present invention, illustrating the lens configuration thereof.
Figure 2:
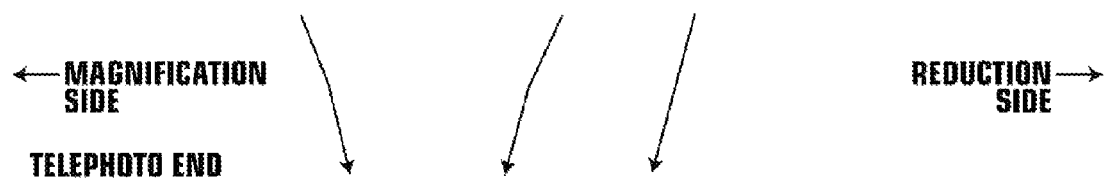
Figure 2:
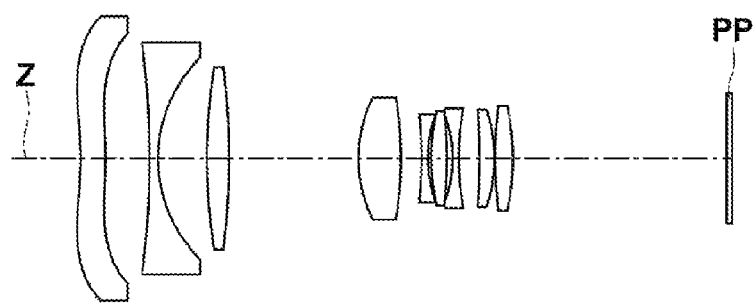

Each of the projection zoom lenses of Example 1 and Example 2 shown in FIG. 1 and FIG. 2, respectively is of a three-group configuration. In contrast, each of the projection zoom lenses of Example 3 through Example 6 shown in FIG. 3 through FIG. 6, respectively is of a four-group configuration.

<The Embodiment of a Three-Group Configuration>

First, the embodiment of the projection zoom lens of a three-configuration will be described, mainly referring to the configuration shown in FIG. 1 as an example. The projection zoom lens of the present embodiment can be used as a projection lens which projects image information displayed on a light valve onto a screen, for example. In FIG. 1, the left side is designated as the magnification side and the right side is designated as the reduction side. Further, supposing a case that the projection zoom lens is mounted on the projection type display devices, FIG. 1 also shows a parallel plate PP. Therefore, an image display surface of the light valve is generally disposed on the reduction side of this parallel plate PP. The same applies to other configurations of FIGS. 2 through 6.

In the projection type display device, a light beam which has been provided with image information at the image display surface of the light valve enters the projection zoom lens through the parallel plate PP. Then, this projection zoom lens projects and displays images based on the above image information onto a screen (not shown) disposed toward the leftward direction of the drawing sheet.

Note that the image display surface of the light valve may be disposed away from the reduction-side surface of the parallel plate PP. Further, the projection type display device may be configured to separate the light beam from the light source into the three primary colors by a color separation optical system, to be provided with three light valves which respectively correspond to the three primary colors, and to enable display of full color images, in addition to disposing an image display surface of one light valve with respect to the projection zoom lens as described above.

the projection zoom lens of the present embodiment substantially consists of a first lens group G1 disposed on the most-magnification side, a second lens group G2 disposed on the reduction side from this first lens group G1, and a third lens group G3 disposed on the most-reduction side, as lens groups. In this case, the first lens group G1 has a negative refractive power, each of the second lens group G2 and the third lens group G2 has a positive refractive power. Further, the first lens group G1, the second lens group G2, and the third lens group G3 are configured to independently move while changing magnification.

In an example shown in FIG. 1, the first lens group G1 consists of two lenses (a first lens L1 and a second lens L2), the second lens group G2 consist of two lenses (a third lens L3 and a fourth lens L4), and the third lens group G3 consist of four lenses (a fifth lens L5 through an eight lens L8). An example shown in FIG. 2 differs from the example of FIG. 1 in the number of lenses such that the third lens group consists of five lenses (a fifth lens L5 through a ninth lens L9) in the example of FIG. 2.

In addition, this projection zoom lens is configured to perform focusing by moving the first lens group G1.

As described above, in the projection zoom lens of the present embodiment, the first lens group G1, which is a lens group on the most-magnification side, substantially consists of two lenses. In such a manner, by configuring the lens group on the most-magnification side, the diameters of lenses within which are generally likely to increase, to consist of a small number of lenses, i.e., two lenses, the projection zoom lens can be manufactured at low cost.

Although cost merits can be obtained in such a manner, there is a possibility that the off-axis aberrations such as distortion and the like will increase due to reduction of the number of lenses. In view of this point, in the present embodiment, conditional formula (1) below is satisfied, where the focal length of the entire system at the wide angle end is fw and the focal length of the first lens group G1 is fm:

$$-3.5 < fm/fw < -1.0 \tag{1}$$

Here, the value of the condition (the conditional expression) defined by conditional formula (1) for each Example is shown in Table 19 together with values of the conditions respectively defined by conditional formulas (2) and (3) to be described later. Note that the focal length fw of the entire system is set as 1.00, and accordingly the values of fm, fr, and Bfw refer to the values of fm/fw, fr/fw, and Bfw/fw, respectively.

As conditional formula (1) described above is satisfied, the off-axis aberration such as distortion and the like, which have occurred due to the reduction of the number of lenses, can be satisfactorily corrected. Further, the power balance of the lens group on the reduction side will be improved and thereby it will be possible to satisfactorily correct field curvature as well.

More specifically, in the case that the value of fm/fw is less than or equal to −3.5 which is the lower limit, the power of the first lens group G1 will excessively decrease. This leads to upsizing of the lens system. In contrast, the value of fm/fw is greater than or equal to −1.0 which is the upper limit, the power of the first lens group G1 will excessively increase. This will make it difficult to correct various aberrations such as distortion, and the like. In the case that conditional formula (1) is satisfied, a compact and low-cost lens system can be obtained while preventing such shortcomings and securing a high zoom ratio. Further, various aberrations, particularly off-axis aberration can be satisfactorily corrected.

In addition, as the projection zoom lens of the present embodiment is particularly configured in such a manner that the first lens group G1, which is the lens group on the most-magnification side, consists of an aspherical surface lens having at least one aspherical surface (the first lens L1) and a biconcave lens (the second lens L2) in this order from the magnification side, the following advantageous effects can be obtained. That is, by disposing an aspherical surface lens on the most-magnification side within the most-magnification-side lens group, the off-axis aberrations, particularly distortion will be effectively corrected. Further, by disposing a negative biconcave lens on the most-reduction side within this lens group, an appropriate amount of a negative power can be obtained as a whole and the off-axis aberrations such as astigmatism and the like will be effectively corrected.

In the projection zoom lens of the present embodiment, the first lens L1 which is an aspherical surface lens is a plastic lens, while the second lens L2 which is a biconcave lens is a glass lens. Thereby, the following advantageous effects can be obtained. That is, such a configuration enables the plastic lens having an aspherical surface and the glass lens to have an aberration correction function and the necessary amount of power, respectively. Thereby, a lens system, which is less likely to be affected by thermal changes and can sufficiently exhibit aberration correction functions, can be formed. Further, forming one lens of a plastic material is advantageous from the viewpoint of productivity and cost.

Further, in the projection zoom lens of the present embodiment, conditional formula (2) below is satisfied, where the focal length of the entire system at the wide angle end is fw and the focal length of the third lens group G3 which is the lens group on the most-reduction side is fr:

$$2.0 < fr/fw < 50.0 \tag{2}$$

This conditional formula (2) defines the condition for satisfactorily correcting field curvature (particularly the sagittal field curvature). It will be difficult to correct field curvature satisfactorily even when the value of fr/fw is less than or equal to 2.0 or greater than or equal to 50.0. In the case that conditional formula (2) is satisfied, the shortcomings described above will be prevented and it will be possible to correct field curvature satisfactorily.

In the projection zoom lens of the present embodiment, the third lens group G3 which is the lens group on the most-reduction side includes a biconcave lens (a fifth lens L5), a positive lens (a sixth lens L6), and a negative lens (a seventh lens L7) with a concave surface toward the magnification side in this order from the magnification side. Such lens arrangement enables the operations and effects obtained by satisfying conditional formula (2) described above to be prominent, and further enables fluctuations in spherical aberration due to zooming to be reduced.

In the projection zoom lens of the present embodiment, conditional formula (3) below is satisfied, where the focal length of the entire system at the wide angle end is fw and the back focus (air converted length) of the entire system at the wide angle end is Bfw:

$$1.0 < Bfw/fw \tag{3}$$

In the case that the value of Bfw/fw becomes less than or equal to 1.0, it will be difficult to arrange the illumination optical system in proximity to the projection zoom lens. However, in the case that conditional formula (3) is satisfied, such a shortcoming can be prevented and arrangement of the illumination optical system will be facilitated.

Further, in the projection zoom lens of the present embodiment, the maximum height of effective rays at a lens surface (which corresponds to a lens surface on the reduction side of the eighth lens L8 in the example of FIG. 1, and to that of the ninth lens L9 in the example of FIG. 2) on the most-reduction side is smaller than the maximum image height on the reduction side. Specific numerical values thereof will be shown later. Thereby, a sufficient lens back can be secured and the diameters of lenses within the lens group on the most-reduction side can be reduced.

The projection zoom lens of the present embodiment is configured in such a manner that three lens groups G1, G2, and G3 independently move as moving groups while changing magnification; and the first lens group G1 moves toward the reduction side while the second lens group and the third lens group move toward the magnification side while changing magnification from the wide angle end to the telephoto end. Such a configuration prevents upsizing of the entire lens system and enables a high zoom ratio to be secured.

The description in the section of "the embodiment of a three-group configuration" basically applies to both of the configurations of FIG. 1 and FIG. 2, except that they differ in the number of lenses that constitute the third lens group G3.

<The Embodiment of a Four-Group Configuration>

Next, the embodiment of the projection zoom lens of a four-group configuration shown in each of FIG. 3 through FIG. 6 will be described mainly with reference to the configuration of FIG. 3 as an example. Note that since the case that the projection zoom lens of the present embodiment is applied to the projection type display device is basically the same as the case that the projection zoom lens of a three-group configuration described above is applied, redundant descriptions thereabout will be omitted.

The projection zoom lens according to the embodiment consists only of a first lens group G1 disposed on the most-magnification side, a second lens group G2 disposed on the reduction side from this first lens group G1, a third lens group G3 disposed on the reduction side from this second lens group G2, and a fourth lens group G4 disposed on the most-reduction side as substantive lens groups. In this case, the first lens group G1 has a negative refractive power; and each of the second lens group G2, the third lens group G3, and the fourth lens group G4 has a positive refractive power. In addition, the first lens group G1, the second lens group G2, the third lens group G3, and the fourth lens group G4 are configured to independently move while changing magnification.

Figure 3:
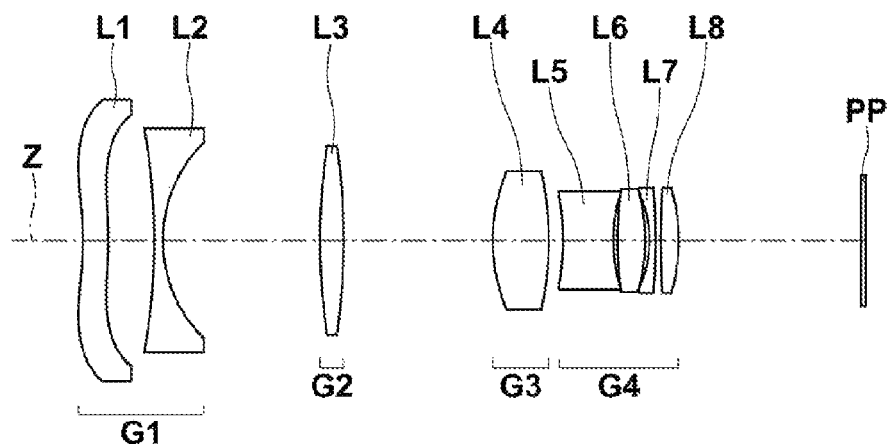
FIG. 3 is a collection of cross-sectional views of a projection zoom lens according to Example 3 of the present invention, illustrating the lens configuration thereof.
Figure 3:
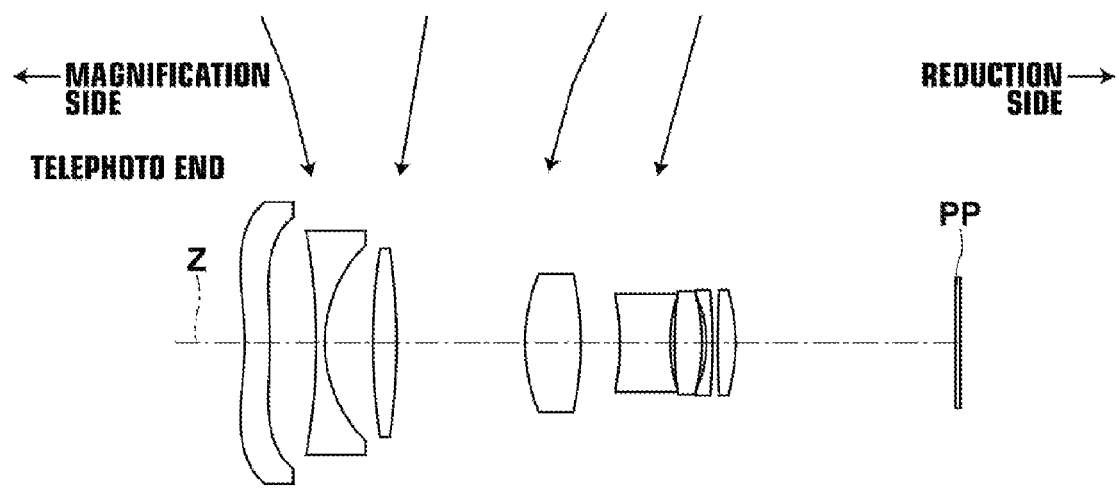

In the example shown in FIG. 3, the first lens group G1 consists of two lenses (the first lens L1 and second lens L2), the second lens group G2 consists of one lens (the third lens L3), and the third lens group G3 consists of one lens (the fourth lens L4). The same applies to the example shown in each of FIG. 4 through FIG. 6. The fourth lens group G4 consists of four lenses (the fifth lens L5 through the eighth lens L8) in the example shown in FIG. 3. In the example shown in FIG. 4, the fourth lens group G4 consists of five lenses (the fifth lens L5 through the ninth lens L9) while in each of the examples of FIG. 5 and FIG. 6, the fourth lens group G4 consists of six lenses (the fifth lens L5 through the tenth lens L10).

Further, this projection zoom lens is configured to perform focusing by moving the first lens group G1.

As described above, in the projection zoom lens of the present embodiment, the first lens group G1, which is the lens group on the most-magnification side, substantially consists of two lenses. Configuring the lens group on the most-magnification side, which generally has large diameters of the lenses, to consist of a small number of lenses, i.e., two lenses in such a manner enables the projection zoom lens to be formed at low cost.

In the present embodiment, conditional formula (1) described above is satisfied (refer to Table 19) as well, where the focal length of the entire system at the wide angle end is fw and the focal length of the first lens group G1 is fm. Thereby, in the present embodiment as well, it will be possible to satisfactorily correct the off-axis aberrations such as distortion, and the like which have occurred due to the reduction of the number of lenses, and further the power balance within the lens group on the reduction side will be improved so that it will be possible to satisfactorily correct the field curvature. The specific reason therefor is as described in detail above.

In addition, as the projection zoom lens of the present embodiment is configured in such a manner that the first lens group G1, which is the lens group on the most-magnification side, consists of an aspherical surface lens having at least one aspherical surface (the first lens L1) and a biconcave lens (the second lens L2) in this order from the magnification side, the off-axis aberrations, particularly distortion will be effectively corrected and the off-axis aberrations such as astigmatism and the like will be effectively corrected. The specific reason therefor is as described in detail above.

Further, in the projection zoom lens of the present embodiment as well, the first lens L1 which is an aspherical surface lens is a plastic lens, while the second lens L2 which is a biconcave lens is a glass lens. Therefore, the lens system, which is less likely to be affected by thermal changes and can sufficiently exhibit the aberration correction functions, can be formed. Further, forming one lens of a plastic material is advantageous from the viewpoint of productivity and cost.

In the projection zoom lens of the present embodiment, the lens group on the most-reduction side is the fourth lens group G4. When the focal length thereof is fr and the focal length of the entire system at the wide angle end is fw, conditional formula (2) described above is also satisfied (refer to Table 19). Therefore, the field curvature can be satisfactorily corrected as well for the same reason as that in the embodiment of a three-group configuration described above.

In the projection zoom lens of the present embodiment, the fourth lens group G4 which is the lens group on the most-reduction side includes a biconcave lens (a fifth lens L5), a positive lens (a sixth lens L6), and a negative lens (a seventh lens L7) with a concave surface toward the magnification side in this order from the magnification side. Such lens arrangement enables the operations and effects obtained by satisfying conditional formula (2) described above to be more prominent, and further enables fluctuations in spherical aberration due to zooming to be reduced.

In the projection zoom lens of the present embodiment, conditional formula (3) described above is satisfied, where the focal length of the entire system at the wide angle end is fw and the back focus (air converted length) of the entire system at the wide angle end is Bfw. Thereby, the arrangement of the illumination optical system will be facilitated.

Figure 4:
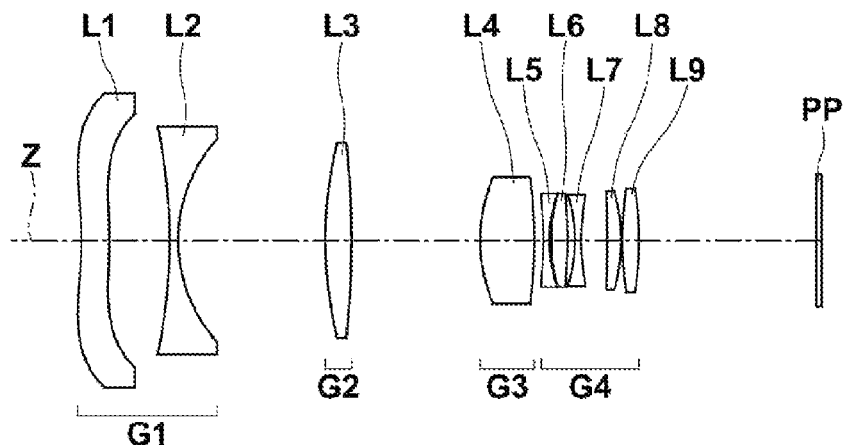
FIG. 4 is a collection of cross-sectional views of a projection zoom lens according to Example 4 of the present invention, illustrating the lens configuration thereof.
Figure 4:
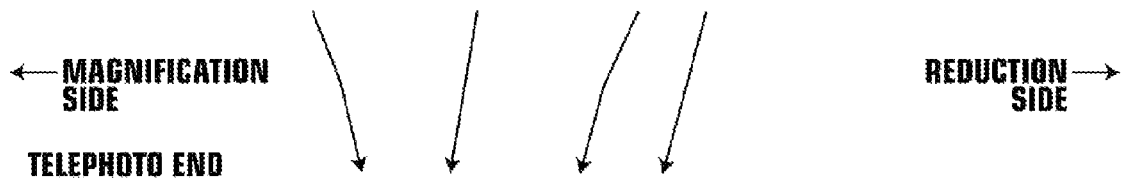
Figure 4:
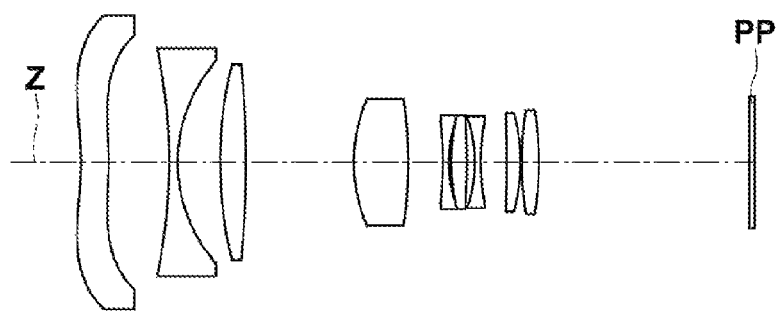
Figure 5:
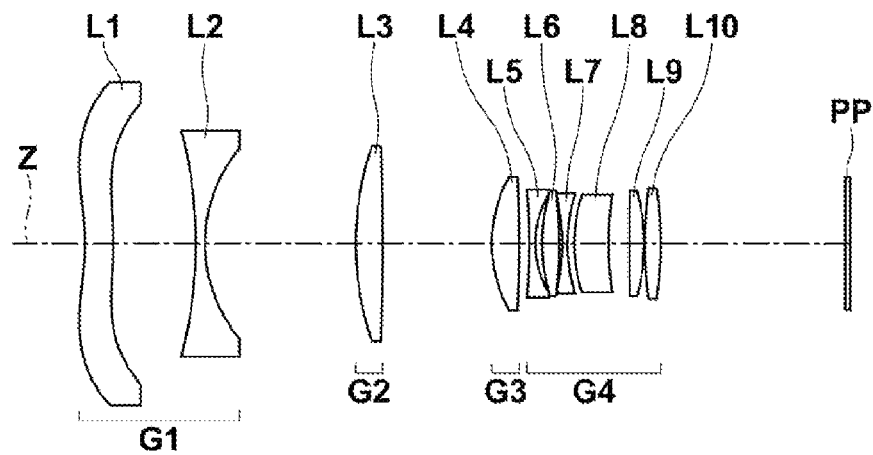
FIG. 5 is a collection of cross-sectional views of a projection zoom lens according to Example 5 of the present invention, illustrating the lens configuration thereof.
Figure 5:
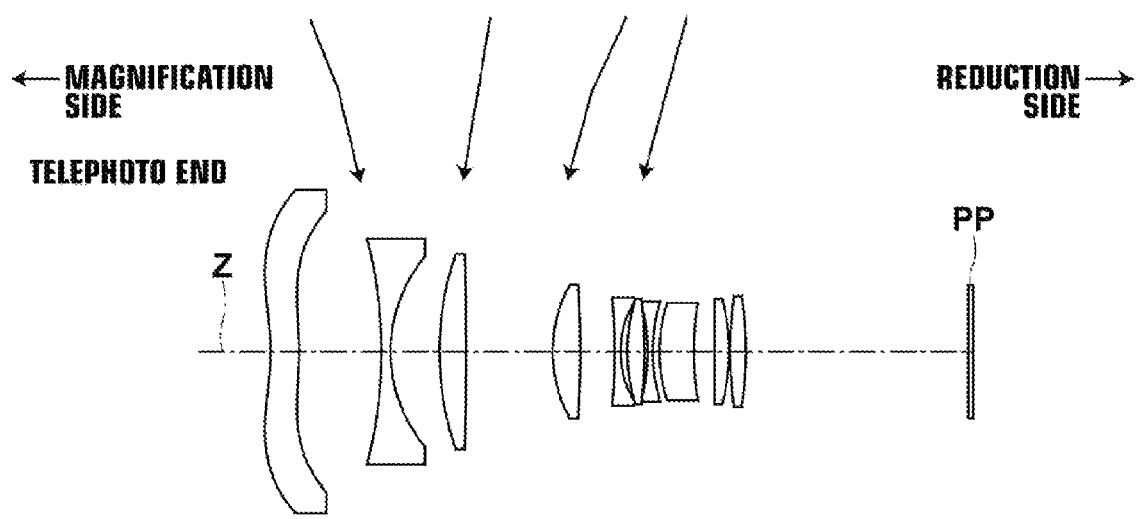
Figure 6:
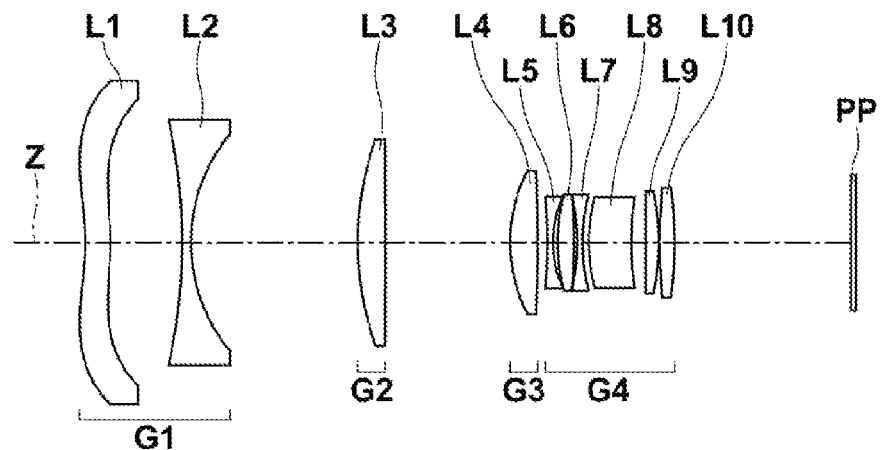
FIG. 6 is a collection of cross-sectional views of a projection zoom lens according to Example 6 of the present invention, illustrating the lens configuration thereof.
Figure 6:
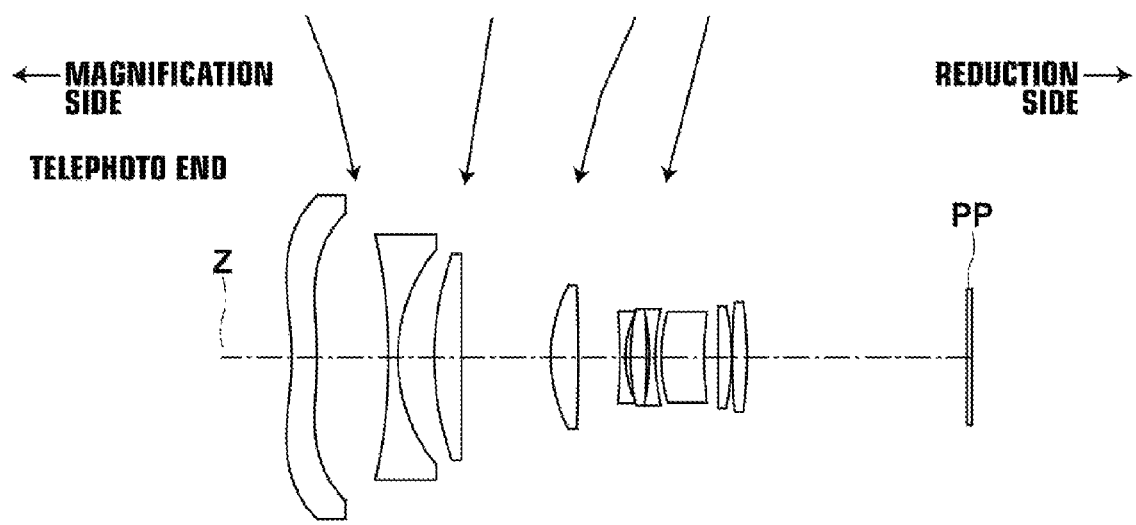

Further, In the projection zoom lens of the present embodiment, the maximum height of effective rays at the lens surface (which corresponds to the lens surface on the reduction side of the eighth lens L8 in the example of FIG. 3, to that of the ninth lens L9 in the example of FIG. 4, and to that of the tenth lens L10 in each of the examples of FIGS. 5 and 6) on the most-reduction side is smaller than the maximum image height on the reduction side. Specific numerical values thereof will be shown later. Thereby, a sufficient lens back can be secured and the diameters of lenses within the lens group on the most-reduction side can be reduced.

The projection zoom lens of the present embodiment is configured in such a manner that the aforementioned four lens groups G1, G2, G3, and G4 independently move as moving groups while changing magnification; and the first lens group G1 moves toward the reduction side, and the second lens group G2, the third lens group G3, and the fourth lens group G4 move toward the magnification side while changing magnification from the wide angle end to the telephoto end. Such configuration enables a high zoom ratio to be secured without upsizing the entire lens system.

Further, as each of the second lens group G2 and the third lens group G3 consists of one single lens, the cost for the projection zoom lens of the present embodiment can be suppressed.

As described above, the description in the section of "the Embodiment of a four-group configuration" is basically the same among the configurations of FIG. 2 through FIG. 6, except for the number of lenses that constitute the fourth lens group G4.

Next, referring to FIG. 13, the embodiment of the projection type display device according to the present invention will be described. FIG. 13 schematically shows a portion of the projection type display device according to one embodiment of the present invention. This projection type display apparatus 100 includes a light source 101, an illumination optical system 102, a DMD 103 as a light valve, and the projection zoom lens 104 according to the embodiment of the present invention.

In this projection type display device 100, a light beam emitted from the light source 101 is selectively and time-sequentially converted into light of the three primary colors (R, G, and B) by a color wheel (not shown), and the light quantity distribution is uniformized on a cross section which is vertical to the optical axis of the light beam by the illumination optical system 102 so as to emit the light onto the DMD 103. In the DMD 103, modulation switching for the colors of light is performed according to switching of colors of incident light. The light which has been optically modulated by the DMD 103 enters the projection zoom lens 104. The projection zoom lens 104 projects an optical image formed by the light which has been optically modulated by the DMD 103 onto a screen 105.

Note that the projection type display device of the present invention is not limited to that of FIG. 13, and various modifications are possible. For example, three DMD's which respectively correspond to each color of light may be used to modulate each of the RGB colors at the same time, instead of disposing a single plate DMD. In this case, a color separation/composition prism (not shown) is disposed between the projection zoom lens 104 and the DMD 103. Further, other light valves such as transmissive liquid crystal display elements and reflective liquid crystal display elements can be used instead of the DMD 103.

Next, Examples of the projection zoom lenses of the present invention will be specifically described. Note that as described above, the projection zoom lenses of Examples 1 and 2 to be described below are of a three-group configuration and the projection zoom lenses of Examples 3 through 6 are of a four-group configuration.

EXAMPLE 1

FIG. 1 shows an arrangement of the lens groups of the projection zoom lens in Example 1 at each of the wide angle end and the telephoto end. Note that since detailed descriptions of FIG. 1 has already been given, redundant descriptions will be omitted unless particularly necessary.

The projection zoom lens of this Example 1 consists of a first lens group G1 having a negative refractive power, a second lens group G2 having a positive refractive power, and a third lens group G3 having a positive refractive power as well, arranged in this order from the magnification side.

The first lens group G1 consists of a first lens L1 which is an aspherical surface lens with both surfaces being aspherical and a second lens L2 which is a biconcave lens arranged in this order from the magnification side. The second lens group G2 consists of a third lens L3 which is a biconvex lens and a fourth lens L4 which is also a biconvex lens arranged in this order from the magnification side. The third lens group G3 consists of a fifth lens L5 which is a biconcave lens, a sixth lens L6 which is a biconvex lens, a seventh lens L7 which is a negative meniscus lens, and an eighth lens L8 which is a biconvex lens arranged in this order from the magnification side.

In the present Example, the maximum image height on the reduction side is 0.555. In contrast, the maximum height of effective rays at the reduction-side lens surface of the eighth lens L8 which is disposed on the most-reduction side is 0.409 that is smaller than the maximum image height described above. Therefore, it becomes possible to sufficiently secure a lens back and to reduce the diameters of the lenses within the third lens group G3, which is provided on the most-reduction side as well.

Table 1 shows basic lens data of the projection zoom lens of Example 1. The aforementioned parallel plate PP is also shown here. In Table 1, the column Si shows the i-th (i=1, 2, 3, . . . ) surface number, the value of i sequentially increasing from the surface of the constituent element at the most-magnification side, which is designated as 1, toward the reduction side. The column Ri shows the radius of curvature of the i-th surface, and the column Di shows the distances between i-th surfaces and (i+1)st surfaces along the optical axis Z. Further, the column Ndj shows the refractive index of a j-th (j=1, 2, 3, . . . ) constituent element with respect to the d-line (wavelength: 587.6 nm), the value of j sequentially increasing from the constituent element at the most magnification side, which is designated as 1, toward the reduction side. The column vdj shows the Abbe number of the j-th constituent element with respect to the d-line.

The values of the radius of curvature R and the distance D between surfaces in Table 1 are normalized with the focal length of the entire system at the wide angle end being 1.00. In addition, the numeral values which are rounded to a predetermined number of digits are shown in Table 1. The sign of the radius of curvature is positive in the case that a surface shape is convex on the magnification side, and negative in the case that the surface shape is convex on the reduction side.

Among the distances D between surfaces, the distance between the first lens group G1 and the second lens group G2, the distance between the second lens group G2 and the third lens group G3, and the distance between the third lens group G3 and the parallel plate PP are variable distances which vary while changing magnification. The spaces of the distance between surfaces corresponding to these distances respectively show D4, D8, and D16 which are respectively represented by indicating "D" with the surface number of the frontward surface from which the distance is measured.

The above is the same as Tables 4, 7, 10, 13, and 16 to be shown below. However, Tables 4, 7, 10, 13, and 16 with respect to the Example of a four-group configuration respectively show four distances as variable distances while changing magnification, which are the distance between the first lens group G1 and the second lens group G2, the distance between the second lens group G2 and the third lens group G3, the distance between the third lens group G3 and the fourth lens group G4, and the distance between the fourth lens group G4 and the parallel plate PP. In the aforementioned three or four variable distances between lens groups, the numbers following "D" are changed according to the number of constituent elements in each Example. In all the Tables, "D" is indicated with the surface number of the frontward surface from which the distance is measured.

In addition, Table 2 shows the focal length f of the entire system and the values of the aforementioned variable distances D4, D8, and D16 at each of the wide angle end, the intermediate focal position, and the telephoto end while changing magnification in the projection zoon lens of Example 1. These numerical values are normalized such that the focal length of the entire system at the wide angle end is 1.00 and the projection distance is 151.087 (which is normalized in the same manner as above). As shown herein, the zoom ratio is 1.50× which is high in the present embodiment.

The manner in which Table 2 is shown as described above is the same as Tables 5, 8, 11, 14, and 17 to be shown later. However, the projection distance is a specific value for each Example and is shown above each Table.

Further, Table 3 shows aspherical data of the projection zoom lens of Example 1. Surface numbers of the aspherical surfaces and aspherical surface coefficients with respect to the aspherical surfaces are shown therein. Note that the aspherical surface coefficients are the values of respective coefficients K, $A_i$ (i=3 through 16) in aspherical surface formula 1 below. In numerical values shown herein, the mark "E" represents that a numerical value following the mark "E" is "an exponent" with the base-10. Further, a numerical value expressed by an exponential function with the base-10 is multiplied with a numerical value followed by "E". For example, the expression "1.0E-02" represents "$1.0 \times 10^{-2}$". The manner in which Table 3 is shown as described above is the same as Tables 6, 9, 12, 15, and 18 to be shown later. In all the Examples, aspherical surfaces are only both surfaces of the first lens L1, and therefore the aspherical surface coefficients with respect to the surface numbers S1 and S2 are shown therein.

TABLE 1

Example 1: Basic Lens Data
Focal Length f = 1.00 ~1.28 ~1.50

| Si Surface Number | Ri Radius of Curvature | Di Distance Between Surfaces | Ndj Refractive Index | vdj Abbe Number |
|---|---|---|---|---|
| 1* | −2.312 | 0.213 | 1.4910 | 57.58 |
| 2* | −3.458 | 0.362 | | |
| 3 | −7.513 | 0.073 | 1.4875 | 70.23 |
| 4 | 1.173 | D4 | | |
| 5 | 5.840 | 0.190 | 1.8340 | 37.16 |
| 6 | −5.738 | 1.146 | | |
| 7 | 1.428 | 0.538 | 1.6230 | 58.16 |
| 8 | −2.334 | D8 | | |
| 9 | −1.890 | 0.200 | 1.7847 | 25.68 |
| 10 | 1.263 | 0.084 | | |
| 11 | 5.783 | 0.144 | 1.7725 | 49.60 |
| 12 | −1.419 | 0.031 | | |
| 13 | −0.911 | 0.051 | 1.5174 | 52.43 |
| 14 | −4.543 | 0.107 | | |

TABLE 1-continued

Example 1: Basic Lens Data
Focal Length f = 1.00 ~1.28 ~1.50

| Si Surface Number | Ri Radius of Curvature | Di Distance Between Surfaces | Ndj Refractive Index | vdj Abbe Number |
|---|---|---|---|---|
| 15 | 9.500 | 0.155 | 1.7880 | 47.37 |
| 16 | −1.474 | D16 | | |
| 17 | ∞ | 0.045 | 1.4875 | 70.23 |
| 18 | ∞ | | | |

*Aspherical Surface

TABLE 2

Example 1: Data Regarding Zooming
Projection Distance: 151.087

| Specifications | Wide Angle End | Intermediate Position | Telephoto End |
|---|---|---|---|
| f | 1.00 | 1.28 | 1.50 |
| D4 | 1.549 | 0.816 | 0.434 |
| D8 | 0.080 | 0.148 | 0.216 |
| D16 | 1.495 | 1.694 | 1.823 |

TABLE 3

Example 1: Aspherical Surface Data

| Aspherical Surface Coefficient: S1 | | Aspherical Surface Coefficient: S2 | |
|---|---|---|---|
| K | 2.06332E+00 | K | 9.15026E+00 |
| A3 | 0.00000E+00 | A3 | 0.00000E+00 |
| A4 | 3.54561E−01 | A4 | 3.66830E−01 |
| A5 | 6.86894E−02 | A5 | −6.70658E−02 |
| A6 | −3.01529E−01 | A6 | 4.57770E−01 |
| A7 | 1.56460E−01 | A7 | −2.21829E+00 |
| A8 | −1.76066E−01 | A8 | 4.87527E+00 |
| A9 | 2.62163E−01 | A9 | −5.98302E+00 |
| A10 | −1.63045E−01 | A10 | 3.20363E+00 |
| A11 | 2.27693E−01 | A11 | 5.95662E−01 |
| A12 | −3.68179E−01 | A12 | −6.12832E−01 |
| A13 | 2.75700E−01 | A13 | −1.67411E+00 |
| A14 | −7.82331E−02 | A14 | 2.49287E+00 |
| A15 | −1.00532E−02 | A15 | −1.54170E+00 |
| A16 | 8.84619E−03 | A16 | 4.11660E−01 |

$$Z = \frac{C \cdot Y^2}{1 + \sqrt{1 - K \cdot C^2 \cdot Y^2}} + \sum_{i=3}^{16} A_i Y^i \quad \text{[Aspherical Surface Formula 1]}$$

Z: the length of a perpendicular line drawn from a point on an aspheric surface with a height Y from the optical axis to a tangent plane (a plane perpendicular to the optical axis) on the peak of the aspheric surface Y: a height from the optical axis K: an eccentricity C: an inverse number of paraxial radius R of the aspheric surface $A_i$: an aspheric surface coefficient (i=3 through 16)

A through D of FIG. 7 respectively show aberration diagrams of spherical aberration, astigmatism, distortion, and lateral chromatic aberration of the projection zoom lens according to Example 1, at the wide angle end. E through H of FIG. 7 respectively show aberration diagrams of spherical aberration, astigmatism, distortion, and lateral chromatic aberration of the projection zoom lens according to Example 1, at the intermediate focal position. I through L of FIG. 7 respectively show aberration diagrams of spherical aberration, astigmatism, distortion, and lateral chromatic aberration of the projection zoom lens according to Example 1, at the telephoto end. In this case, each aberration is for when the projection distance is 151.087 as described above. FIG. 7 also shows a F number "FNo." and a full angle of view "2ω" (the unit is degree) at each of the wide angle end, the intermediate focal position, and the telephoto end of Example 1.

Each of the aberration diagrams of A through L of FIG. 7 applies the d-line as a reference. However, the spherical aberration diagram shows aberrations with respect to the F-line (wavelength: 486.1 nm) and the C-line (wavelength: 656.3 nm) as well, and the lateral chromatic aberration diagram also shows aberrations with respect to the F-line and the C-line. Further, the astigmatism diagram shows aberration in a sagittal direction with a solid line and aberration in a tangential direction with a broken line.

Arrangement diagrams of lens groups, the symbols in the Tables and the aberration diagrams, the meanings thereof, and the manners in which they are shown for Example 1 described above are basically the same for Examples 2 through 6 below, unless otherwise noted. The points that the arrangement diagrams (FIG. 1) of the lens groups of Example 1 described above are at the wide angle end and at the telephoto end, and that the aberration diagrams are at the wide angle end, the intermediate focal position, and the telephoto end also apply to Examples 2 through 6.

EXAMPLE 2

FIG. 2 shows the arrangement of lens groups of the projection zoom lens in Example 2 at each of the wide angle end and the telephoto end. This projection zoom lens in Example 2 consists of a first lens group G1 having a negative refractive power, a second lens group G2 having a positive refractive power, and a third lens group G3 having a positive refractive power as well, arranged in this order from the magnification side.

The first lens group G1 consists of a first lens L1 which is an aspherical surface lens with both surfaces aspherical and a second lens L2 which is a biconcave lens arranged in this order from the magnification side. The second lens group G2 consists of a third lens L3 which is a biconvex lens and a fourth lens L4 which is also a biconvex lens arranged in this order from the magnification side. The third lens group G3 consists of a fifth lens L5 which is a biconcave lens, a sixth lens L6 which is a biconvex lens, a seventh lens L7 which is a biconcave lens, an eighth lens L8 which is a positive meniscus lens, and a ninth lens L9 which is a biconvex lens arranged in this order from the magnification side.

In the present Example, the maximum image height on the reduction side is 0.554. In contrast, the maximum height of effective rays at the reduction-side lens surface of the ninth lens L9 which is disposed on the most-reduction side is 0.407, which is smaller than the maximum image height described above (note that these values are normalized with the focal length of the entire system at the wide angle end being 1.00. The same applies hereinafter). Therefore, it becomes possible to sufficiently secure a lens back and to reduce the diameters of the lenses within the third lens group G3, which is provided on the most-reduction side as well.

Table 4 shows basic lens data of the projection zoom lens of Example 2. Further, Table 5 shows the values of the focal length f of the entire system, the variable distances D4, D8, and D18 at each of the wide angle end, at the intermediate focal position, and at the telephoto end while the projection zoom lens of Example 2 changing magnification. As shown here, in the present Example, the zoom ratio is 1.50× which is high. These values are for when the projection distance is 151.073. Further, Table 6 shows aspherical surface data of the projection zoom lens in Example 2.

TABLE 4

Example 2: Basic Lens Data
Focal Length f = 1.00~1.28~1.50

| Si Surface Number | Ri Radius of Curvature | Di Distance Between Surfaces | Ndj Refractive Index | vdj Abbe Number |
|---|---|---|---|---|
| 1* | −2.576 | 0.213 | 1.4910 | 57.58 |
| 2* | −4.159 | 0.377 | | |
| 3 | −7.516 | 0.073 | 1.4875 | 70.23 |
| 4 | 1.212 | D4 | | |
| 5 | 5.113 | 0.187 | 1.8340 | 37.16 |
| 6 | −6.425 | 1.111 | | |
| 7 | 1.198 | 0.362 | 1.6385 | 55.38 |
| 8 | −3.136 | D8 | | |
| 9 | −3.178 | 0.051 | 1.7552 | 27.51 |
| 10 | 1.054 | 0.030 | | |
| 11 | 1.833 | 0.134 | 1.7725 | 49.60 |
| 12 | −3.677 | 0.049 | | |
| 13 | −1.061 | 0.051 | 1.5317 | 48.84 |
| 14 | 2.335 | 0.181 | | |
| 15 | −5.593 | 0.124 | 1.6031 | 60.64 |
| 16 | −1.362 | 0.009 | | |
| 17 | 3.772 | 0.153 | 1.6031 | 60.64 |
| 18 | −2.037 | D18 | | |
| 19 | ∞ | 0.045 | 1.4875 | 70.23 |
| 20 | ∞ | | | |

*Aspherical Surface

TABLE 5

Example 2: Data Regarding Zooming
Projection Distance: 151.073

| Specifications | Wide Angle End | Intermediate Position | Telephoto End |
|---|---|---|---|
| f | 1.00 | 1.28 | 1.50 |
| D4 | 1.531 | 0.799 | 0.417 |
| D8 | 0.074 | 0.127 | 0.178 |
| D18 | 1.495 | 1.696 | 1.834 |

TABLE 6

Example 2: Aspherical Surface Data

| | Aspherical Surface Coefficient: S1 | | Aspherical Surface Coefficient: S2 |
|---|---|---|---|
| K | 1.59756E+00 | K | 1.30165E+01 |
| A3 | 0.00000E+00 | A3 | 0.00000E+00 |
| A4 | 3.27341E−01 | A4 | 3.68166E−01 |
| A5 | 2.25163E−01 | A5 | −4.63789E−02 |
| A6 | −6.77775E−01 | A6 | 5.27670E−01 |
| A7 | 5.12427E−01 | A7 | −2.54281E+00 |
| A8 | −2.71038E−01 | A8 | 5.04794E+00 |
| A9 | 1.88275E−01 | A9 | −5.67991E+00 |
| A10 | −1.01570E−01 | A10 | 3.03259E+00 |
| A11 | 2.01266E−01 | A11 | 3.25382E−01 |
| A12 | −3.50013E−01 | A12 | −3.78473E−01 |
| A13 | 2.51833E−01 | A13 | −1.84739E+00 |
| A14 | −5.96811E−02 | A14 | 2.68859E+00 |
| A15 | −1.12713E−02 | A15 | −1.57584E+00 |
| A16 | 5.79712E−03 | A16 | 3.73772E−01 |

A through L of FIG. 8 respectively show aberration diagrams of the projection zoom lens of Example 2. Each of the aberration diagrams is for when the projection distance is 151.073 described above.

EXAMPLE 3

FIG. 3 shows the arrangement of lens groups of the projection zoom lens in Example 3 at each of the wide angle end and the telephoto end. This projection zoom lens in Example 3 consists of a first lens group G1 having a negative refractive power, a second lens group G2 having a positive refractive power, a third lens group G3 having a positive refractive power, and a fourth lens group G4 having a positive refractive power arranged in this order from the magnification side.

The first lens group G1 consists of a first lens L1 which is an aspherical surface lens with both surfaces aspherical and a second lens L2 which is a biconcave lens arranged in this order from the magnification side. The second lens group G2 consists of a third lens L3 which is one biconvex lens. The third lens group G3 also consists of a fourth lens L4 which is one biconvex lens. The fourth lens group G4 consists of a fifth lens L5 which is a biconcave lens, a sixth lens L6 which is a biconvex lens, a seventh lens L7 which is a negative meniscus lens, and an eighth lens L8 which is a biconvex lens arranged in this order from the magnification side.

In the present Example, the maximum image height on the reduction side is 0.555. In contrast, the maximum height of effective rays at the reduction-side lens surface of the eighth lens L8 which is disposed on the most-reduction side is 0.414 that is smaller than the maximum image height described above. Therefore, it becomes possible to sufficiently secure a lens back and to reduce the diameters of the lenses within the fourth lens group G4, which is provided on the most-reduction side as well.

Table 7 shows basic lens data of the projection zoom lens of Example 3. Further, Table 8 shows the values of the focal length f of the entire system, the variable distances D4, D6, D8, and D16 at each of the wide angle end, at the intermediate focal position, and at the telephoto end while the projection zoom lens of Example 3 changing magnification. As shown here, in the present Example, the zoom ratio is 1.50× which is high. These values are for when the projection distance is 151.121. Further, Table 9 shows aspherical surface data of the projection zoom lens in Example 3.

TABLE 7

Example 3: Basic Lens Data
Focal Length f = 1.00~1.28~1.50

| Si Surface Number | Ri Radius of Curvature | Di Distance between Surfaces | Ndj Refractive Index | vdj Abbe Number |
|---|---|---|---|---|
| 1* | −2.279 | 0.213 | 1.4910 | 57.58 |
| 2* | −3.503 | 0.391 | | |
| 3 | −5.351 | 0.072 | 1.5182 | 58.90 |
| 4 | 1.174 | D4 | | |
| 5 | 5.397 | 0.200 | 1.8061 | 33.27 |
| 6 | −5.715 | D6 | | |
| 7 | 1.529 | 0.474 | 1.6031 | 60.64 |
| 8 | −2.683 | D8 | | |
| 9 | −2.120 | 0.427 | 1.8052 | 25.42 |
| 10 | 1.402 | 0.035 | | |
| 11 | 3.351 | 0.235 | 1.7725 | 49.60 |
| 12 | −1.535 | 0.036 | | |
| 13 | −0.961 | 0.051 | 1.5174 | 52.43 |
| 14 | −6.085 | 0.045 | | |
| 15 | 7.437 | 0.151 | 1.8040 | 46.57 |
| 16 | −1.616 | D16 | | |
| 17 | ∞ | 0.045 | 1.4875 | 70.23 |
| 18 | ∞ | | | |

*Aspherical Surface

TABLE 8

Example 3: Data Regarding Zooming
Projection Distance: 151.121

| Specifications | Wide Angle End | Intermediate Position | Telephoto End |
|---|---|---|---|
| f | 1.00 | 1.28 | 1.50 |
| D4 | 1.331 | 0.700 | 0.406 |
| D6 | 1.263 | 1.181 | 1.087 |
| D8 | 0.120 | 0.226 | 0.330 |
| D16 | 1.542 | 1.745 | 1.861 |

TABLE 9

Example 3: Aspherical Surface Data

| | Aspherical Surface Coefficient: S1 | | Aspherical Surface Coefficient: S2 |
|---|---|---|---|
| K | 2.54049E+00 | K | 9.64671E+00 |
| A3 | 0.00000E+00 | A3 | 0.00000E+00 |
| A4 | 4.75727E−01 | A4 | 5.12733E−01 |
| A5 | −1.99969E−01 | A5 | −6.04845E−01 |
| A6 | −5.38928E−02 | A6 | 1.57210E+00 |
| A7 | −7.86746E−01 | A7 | −4.27439E+00 |
| A8 | 4.49106E+00 | A8 | 8.10877E+00 |
| A9 | −1.00058E+01 | A9 | −7.61819E+00 |
| A10 | 1.07652E+01 | A10 | −1.41150E+00 |
| A11 | −3.89912E+00 | A11 | 7.04929E+00 |
| A12 | −2.49846E+00 | A12 | 5.97350E+00 |
| A13 | 2.09963E+00 | A13 | −2.53230E+01 |
| A14 | 6.82327E−01 | A14 | 2.72182E+01 |
| A15 | −1.08338E+00 | A15 | −1.37199E+01 |
| A16 | 2.94810E−01 | A16 | 2.83986E+00 |

A through L of FIG. 9 respectively show aberration diagrams of the projection zoom lens of Example 3. Each of the aberration diagrams is for when the projection distance is 151.121 described above.

EXAMPLE 4

FIG. 4 shows the arrangement of lens groups of the projection zoom lens in Example 4 at each of the wide angle end and the telephoto end. This projection zoom lens in Example 4 consists of a first lens group G1 having a negative refractive power, a second lens group G2 having a positive refractive power, a third lens group G3 having a positive refractive power, and a fourth lens group G4 having a positive refractive power arranged in this order from the magnification side.

The first lens group G1 consists of a first lens L1 which is an aspherical surface lens with both surfaces being aspherical and a second lens L2 which is a biconcave lens arranged in this order from the magnification side. The second lens group G2 consists of a third lens L3 which is one biconvex lens. The third lens group G3 also consists of a fourth lens L4 which is one biconvex lens. The fourth lens group G4 consists of a fifth lens L5 which is a biconcave lens, a sixth lens L6 which is a biconvex lens, a seventh lens L7 which is a biconcave lens, an eighth lens L8 which is a positive meniscus lens, and a ninth lens L9 which is a biconvex lens arranged in this order from the magnification side.

In the present Example, the maximum image height on the reduction side is 0.554. In contrast, the maximum height of effective rays at the reduction-side lens surface of the ninth lens L9 which is disposed on the most-reduction side is 0.401, which is smaller than the maximum image height described above. Therefore, it becomes possible to sufficiently secure a lens back and to reduce the diameters of the lenses within the fourth lens group G4, which is provided on the most-reduction side as well.

Table 10 shows basic lens data of the projection zoom lens of Example 4. Further, Table 11 shows the values of the focal length f of the entire system, the variable distances D4, D6, D8, and D18 at each of the wide angle end, at the intermediate focal position, and at the telephoto end while the projection zoom lens of Example 4 changing magnification. As shown here, in the present Example, the zoom ratio is 1.50× which is high. These values are for when the projection distance is 151.078. Further, Table 12 shows aspherical surface data of the projection zoom lens in Example 4.

TABLE 10

Example 4: Basic Lens Data
Focal Length f = 1.00~1.28~1.50

| Si Surface Number | Ri Radius of Curvature | Di Distance Between Surfaces | Ndj Refractive Index | vdj Abbe Number |
|---|---|---|---|---|
| 1* | −2.397 | 0.231 | 1.4910 | 57.58 |
| 2* | −4.262 | 0.511 | | |
| 3 | −4.681 | 0.073 | 1.5182 | 58.90 |
| 4 | 1.279 | D4 | | |
| 5 | 3.434 | 0.219 | 1.8061 | 33.27 |
| 6 | −8.099 | D6 | | |
| 7 | 1.353 | 0.458 | 1.6230 | 58.16 |
| 8 | −3.783 | D8 | | |
| 9 | −3.371 | 0.051 | 1.7847 | 25.68 |
| 10 | 1.121 | 0.018 | | |
| 11 | 1.464 | 0.135 | 1.7725 | 49.60 |
| 12 | −4.967 | 0.065 | | |
| 13 | −1.230 | 0.051 | 1.5317 | 48.84 |
| 14 | 1.966 | 0.221 | | |
| 15 | −11.791 | 0.118 | 1.6230 | 58.16 |
| 16 | −1.472 | 0.008 | | |
| 17 | 2.830 | 0.144 | 1.6230 | 58.16 |
| 18 | −2.611 | D18 | | |
| 19 | ∞ | 0.045 | 1.4875 | 70.23 |
| 20 | ∞ | | | |

*Aspherical Surface

TABLE 11

Example 4: Data Regarding Zooming
Projection Distance: 151.078

| Specifications | Wide Angle End | Intermediate Position | Telephoto End |
|---|---|---|---|
| f | 1.00 | 1.28 | 1.50 |
| D4 | 1.241 | 0.635 | 0.357 |
| D6 | 1.087 | 1.017 | 0.910 |
| D8 | 0.073 | 0.185 | 0.291 |
| D18 | 1.495 | 1.677 | 1.777 |

TABLE 12

Example 4: Aspherical Surface Data

| Aspherical Surface Coefficient: S1 | | Aspherical Surface Coefficient: S2 | |
|---|---|---|---|
| K | 8.94040E−01 | K | 1.37069E+01 |
| A3 | 0.00000E+00 | A3 | 0.00000E+00 |
| A4 | 4.33173E−01 | A4 | 4.88484E−01 |
| A5 | −7.86385E−02 | A5 | −4.42258E−01 |
| A6 | −3.08881E−01 | A6 | 1.11661E+00 |
| A7 | 3.28402E−01 | A7 | −2.91172E+00 |
| A8 | −2.69902E−01 | A8 | 5.06696E+00 |
| A9 | 2.25944E−01 | A9 | −5.68870E+00 |
| A10 | −1.33723E−01 | A10 | 3.21687E+00 |
| A11 | 2.23723E−01 | A11 | 3.35956E−01 |
| A12 | −3.63984E−01 | A12 | −6.56360E−01 |
| A13 | 2.63322E−01 | A13 | −1.74142E+00 |
| A14 | −6.99682E−02 | A14 | 2.65971E+00 |
| A15 | −3.94575E−03 | A15 | −1.41614E+00 |
| A16 | 3.55665E−03 | A16 | 2.84312E−01 |

A through L of FIG. 10 respectively show aberration diagrams of the projection zoom lens of Example 4. Each of the aberration diagrams is for when the projection distance is 151.078 described above.

EXAMPLE 5

FIG. 5 shows the arrangement of lens groups of the projection zoom lens in Example 5 at each of the wide angle end and the telephoto end. This projection zoom lens in Example 5 consists of a first lens group G1 having a negative refractive power, a second lens group G2 having a positive refractive power, a third lens group G3 having a positive refractive power, and a fourth lens group G4 having a positive refractive power arranged in this order from the magnification side.

The first lens group G1 consists of a first lens L1 which is an aspherical surface lens with both surfaces aspherical and a second lens L2 which is a biconcave lens arranged in this order from the magnification side. The second lens group G2 consists of a third lens L3 which is one biconvex lens. The third lens group G3 also consists of a fourth lens L4 which is one biconvex lens. The fourth lens group G4 consists of a fifth lens L5 which is a biconcave lens, a sixth lens L6 which is a biconvex lens, a seventh lens L7 which is a biconcave lens, an eighth lens L8 which is a positive meniscus lens, a ninth lens L9 which is a biconvex lens, and a tenth lens L10 which is a biconvex lens arranged in this order from the magnification side.

In the present Example, the maximum image height on the reduction side is 0.553. In contrast, the maximum height of effective rays at the reduction-side lens surface of the tenth lens L10 which is disposed on the most-reduction side is 0.415, which is smaller than the maximum image height described above. Therefore, it becomes possible to sufficiently secure a lens back and to reduce the diameters of the lenses within the fourth lens group G4, which is provided on the most-reduction side as well.

Table 13 shows basic lens data of the projection zoom lens of Example 5. Further, Table 14 shows the values of the focal length f of the entire system, the variable distances D4, D6, D8, and D20 at each of the wide angle end, at the intermediate focal position, and at the telephoto end while the projection zoom lens of Example 5 changing magnification. As shown here, in the present Example, the zoom ratio is 1.50× which is high. These values are for when the projection distance is 120.516. Further, Table 15 shows aspherical surface data of the projection zoom lens in Example 5.

TABLE 13

Example 5: Basic Lens Data
Focal Length f = 1.00~1.28~1.50

| Si Surface Number | Ri Radius of Curvature | Di Distance Between Surfaces | Ndj Refractive Index | vdj Abbe Number |
|---|---|---|---|---|
| 1* | −1.967 | 0.235 | 1.4910 | 57.58 |
| 2* | −3.090 | 0.686 | | |
| 3 | −3.747 | 0.077 | 1.4875 | 70.23 |
| 4 | 1.233 | D4 | | |
| 5 | 2.506 | 0.221 | 1.8340 | 37.16 |
| 6 | −26.254 | D6 | | |
| 7 | 1.146 | 0.228 | 1.6031 | 60.64 |
| 8 | −9.631 | D8 | | |
| 9 | −4.981 | 0.047 | 1.5174 | 52.43 |
| 10 | 0.790 | 0.058 | | |
| 11 | 1.524 | 0.140 | 1.7725 | 49.60 |
| 12 | −3.956 | 0.024 | | |
| 13 | −1.703 | 0.047 | 1.8052 | 25.42 |
| 14 | 1.469 | 0.054 | | |
| 15 | 1.278 | 0.284 | 1.4875 | 70.23 |
| 16 | 2.524 | 0.174 | | |
| 17 | 91.473 | 0.121 | 1.6584 | 50.88 |
| 18 | −1.669 | 0.008 | | |
| 19 | 3.604 | 0.130 | 1.6230 | 58.16 |
| 20 | −3.191 | D20 | | |
| 21 | ∞ | 0.045 | 1.4875 | 70.23 |
| 22 | ∞ | | | |

*Aspherical Surface

TABLE 14

Example 5: Data Regarding Zooming
Projection Distance: 120.516

| Specifications | Wide Angle End | Intermediate Position | Telephoto End |
|---|---|---|---|
| f | 1.00 | 1.28 | 1.50 |
| D4 | 1.250 | 0.670 | 0.403 |
| D6 | 0.908 | 0.842 | 0.717 |
| D8 | 0.084 | 0.191 | 0.288 |
| D20 | 1.530 | 1.726 | 1.844 |

TABLE 15

Example 5: Aspherical Surface Data

| | Aspherical Surface Coefficient: S1 | | Aspherical Surface Coefficient: S2 |
|---|---|---|---|
| K | 1.70862E+00 | K | 6.30089E+00 |
| A3 | 0.00000E+00 | A3 | 0.00000E+00 |
| A4 | 4.24969E−01 | A4 | 4.25593E−01 |
| A5 | 2.33200E−01 | A5 | 1.47667E−01 |
| A6 | 9.83826E−02 | A6 | −4.47129E−02 |
| A7 | −3.69386E+00 | A7 | −1.37843E+00 |
| A8 | 8.16787E+00 | A8 | 1.47021E+00 |
| A9 | −8.40971E+00 | A9 | 6.90860E−01 |
| A10 | 4.96637E+00 | A10 | −2.94357E−01 |
| A11 | −2.56097E+00 | A11 | −3.30277E+00 |
| A12 | 1.81130E+00 | A12 | 3.27768E+00 |
| A13 | −7.01923E−01 | A13 | 9.69386E−01 |
| A14 | −3.13180E−01 | A14 | −2.91857E+00 |
| A15 | 3.61467E−01 | A15 | 1.53508E+00 |
| A16 | −8.65190E−02 | A16 | −2.62269E−01 |

A through L of FIG. 11 respectively show aberration diagrams of the projection zoom lens of Example 5. Each of the aberration diagrams is for when the projection distance is 120.516 described above.

EXAMPLE 6

FIG. 6 shows the arrangement of lens groups of the projection zoom lens in Example 6 at each of the wide angle end and the telephoto end. This projection zoom lens in Example 6 consists of a first lens group G1 having a negative refractive power, a second lens group G2 having a positive refractive power, a third lens group G3 having a positive refractive power, and a fourth lens group G4 having a positive refractive power arranged in this order from the magnification side.

The first lens group G1 consists of a first lens L1 which is an aspherical surface lens with both surfaces being aspherical and a second lens L2 which is a biconcave lens arranged in this order from the magnification side. The second lens group G2 consists of a third lens L3 which is one biconvex lens. The third lens group G3 also consists of a fourth lens L4 which is one biconvex lens. The fourth lens group G4 consists of a fifth lens L5 which is a biconcave lens, a sixth lens L6 which is a biconvex lens, a seventh lens L7 which is a biconcave lens, an eighth lens L8 which is a positive meniscus lens, a ninth lens L9 which is a biconvex lens, and a tenth lens L10 which is a biconvex lens arranged in this order from the magnification side.

In the present Example, the maximum image height on the reduction side is 0.553. In contrast, the maximum height of effective rays at the reduction-side lens surface of the tenth lens L10 which is disposed on the most-reduction side is 0.408, which is smaller than the maximum image height described above. Therefore, it becomes possible to sufficiently secure a lens back and to reduce the diameters of the lenses within the fourth lens group G4, which is provided on the most-reduction side as well.

Table 16 shows basic lens data of the projection zoom lens of Example 6. Further, Table 17 shows values of the focal length f of the entire system, the variable distances D4, D6, D8, and D20 at each of the wide angle end, at the intermediate focal position, and at the telephoto end while the projection zoom lens of Example 6 changing magnification. As shown here, in the present Example, the zoom ratio is 1.64× which is high. These values are for when the projection distance is 120.472. Further, Table 18 shows aspherical surface data of the projection zoom lens in Example 6.

TABLE 16

Example 6: Basic Lens Data
Focal Length f = 1.00~1.34~1.64

| Si Surface Number | Ri Radius of Curvature | Di Distance Between Surfaces | Ndj Refractive Index | vdj Abbe Number |
|---|---|---|---|---|
| 1* | −1.951 | 0.213 | 1.4910 | 57.58 |
| 2* | −2.863 | 0.607 | | |
| 3 | −4.478 | 0.077 | 1.5163 | 64.14 |
| 4 | 1.349 | D4 | | |
| 5 | 2.444 | 0.233 | 1.8340 | 37.16 |
| 6 | −103.668 | D6 | | |
| 7 | 1.232 | 0.233 | 1.6516 | 58.55 |
| 8 | −13.925 | D8 | | |
| 9 | −4.259 | 0.047 | 1.5407 | 47.23 |
| 10 | 0.841 | 0.042 | | |
| 11 | 1.560 | 0.137 | 1.7725 | 49.60 |
| 12 | −4.448 | 0.025 | | |
| 13 | −1.750 | 0.047 | 1.7847 | 25.68 |
| 14 | 1.555 | 0.053 | | |
| 15 | 1.320 | 0.361 | 1.4875 | 70.23 |
| 16 | 2.713 | 0.117 | | |
| 17 | 221.972 | 0.114 | 1.7725 | 49.60 |
| 18 | −1.973 | 0.009 | | |

TABLE 16-continued

Example 6: Basic Lens Data
Focal Length f = 1.00~1.34~1.64

| Si Surface Number | Ri Radius of Curvature | Di Distance Between Surfaces | Ndj Refractive Index | vdj Abbe Number |
|---|---|---|---|---|
| 19 | 4.724 | 0.125 | 1.7130 | 53.87 |
| 20 | −3.227 | D20 | | |
| 21 | ∞ | 0.045 | 1.4875 | 70.23 |
| 22 | ∞ | | | |

*Aspherical Surface

TABLE 17

Example 6: Data Regarding Zooming
Projection Distance: 120.472

| Specifications | Wide Angle End | Intermediate Position | Telephoto End |
|---|---|---|---|
| f | 1.00 | 1.34 | 1.64 |
| D4 | 1.411 | 0.653 | 0.307 |
| D6 | 1.054 | 0.968 | 0.753 |
| D8 | 0.083 | 0.212 | 0.350 |
| D20 | 1.490 | 1.718 | 1.860 |

TABLE 18

Example 6: Aspherical Surface Data

| Aspherical Surface Coefficient: S1 | | Aspherical Surface Coefficient: S2 | |
|---|---|---|---|
| K | 1.88547E+00 | K | 5.28004E+00 |
| A3 | 0.00000E+00 | A3 | 0.00000E+00 |
| A4 | 4.82221E−01 | A4 | 4.71871E−01 |
| A5 | 8.87720E−02 | A5 | −1.32657E−02 |
| A6 | −6.30184E−01 | A6 | −1.86318E−01 |
| A7 | 4.33252E−01 | A7 | −4.54146E−01 |
| A8 | −2.95186E−01 | A8 | 1.24011E+00 |
| A9 | 8.01222E−01 | A9 | −1.14556E+00 |
| A10 | −9.98347E−01 | A10 | 8.54298E−01 |
| A11 | 4.77611E−01 | A11 | −2.75941E+00 |
| A12 | −7.35872E−02 | A12 | 6.05070E+00 |
| A13 | 1.82774E−01 | A13 | −5.64921E+00 |
| A14 | −3.03054E+00 | A14 | 1.63871E+00 |
| A15 | 1.76860E−01 | A15 | 6.21237E−01 |
| A16 | −3.60216E−02 | A16 | −3.47704E−01 |

A through L of FIG. 12 respectively show aberration diagrams of the projection zoom lens of Example 6. Each of the aberration diagrams is for when the projection distance is 120.472 described above.

Further, Table 19 shows values for conditions (conditional expressions) defined by conditional formulas (1) through (3) described above. As mentioned above, the focal length fw of the entire system is set as 1.00 here, and accordingly the values of fm, fr, and Bfw refer to the values of fm/fw, fr/fw, and Bfw/fw, respectively.

TABLE 19

| | Example 1 | Example 2 | Example 3 | Example 4 | Example 5 | Example 6 |
|---|---|---|---|---|---|---|
| fw | 1.00 | 1.00 | 1.00 | 1.00 | 1.00 | 1.00 |
| (1) fm | −1.74 | −1.77 | −1.55 | −1.55 | −1.50 | −1.62 |

TABLE 19-continued

| | Example 1 | Example 2 | Example 3 | Example 4 | Example 5 | Example 6 |
|---|---|---|---|---|---|---|
| (2) fr | 19.16 | 23.13 | 8.62 | 5.92 | 4.41 | 4.67 |
| (3) Bfw | 1.53 | 1.53 | 1.57 | 1.52 | 1.56 | 1.52 |

As described above, the present invention has been described with reference to the Embodiments and Examples. The projection zoom lens of the present invention is not limited to the embodiments and the examples described above, and various modifications of embodiments are possible. For example, values, such as the radius of curvature, the distances between surfaces, the refractive indices, the Abbe numbers of each lens element, and the like can be varied as appropriate.

Further, the projection type display device of the present invention is also not limited to the configurations described above. For example, the light valves to be used and optical members used for the light flux separation or composition are not limited to the above configurations, and various modifications are possible.

What is claimed is:

1. A projection zoom lens in which a magnification change operation is performed by moving groups of lenses, the projection zoom lens comprising:
    a lens group on a most-magnification side that consists of a moving group having a negative refractive power; and
    a lens group on a most-reduction side that consists of a moving group having a positive refractive power, which includes a biconcave lens, a positive lens, and a negative lens with a concave surface toward the most-magnification side in this order from the most-magnification side,
    wherein the lens group on the most-magnification side consists of two lenses, and
    wherein conditional formula (1) below is satisfied:

$$-3.5 < fm/fw < -1.0 \quad (1),\text{ where}$$

fw: the focal length of the entire system at the wide angle end, and
    fm: the focal length of the lens group on the most-magnification side.

2. The projection zoom lens of claim 1, wherein the lens group on the most-magnification side consists of an aspherical surface lens having at least one aspherical surface, and a biconcave lens, in this order from the most-magnification side.

3. The projection zoom lens of claim 2, wherein the aspherical surface lens is formed of a plastic material and the biconcave lens is formed of a glass material.

4. The projection zoom lens of claim 1, wherein conditional formula (2) below is satisfied:

$$2.0 < fr/fw < 50.0 \quad (2),$$

where
    fw: the focal length of the entire system at the wide angle end, and
    fr: the focal length of the lens group on the most-reduction side.

5. The projection zoom lens of claim 2, wherein conditional formula (2) below is satisfied:

$$2.0 < fr/fw < 50.0 \quad (2),$$

where
    fw: the focal length of the entire system at the wide angle end, and
    fr: the focal length of the lens group on the most-reduction side.

6. The projection zoom lens of claim 3, wherein conditional formula (2) below is satisfied:

$$2.0 < fr/fw < 50.0 \quad (2),$$

where
fw: the focal length of the entire system at the wide angle end, and
fr: the focal length of the lens group on the most-reduction side.

7. The projection zoom lens of claim 1, wherein the projection zoom lens consists of:
the lens group on the most-magnification side as a negative first lens group;
a positive second lens group; and
the lens group on the most-reduction side as a positive third lens group;
the negative first lens group, the positive second lens group, and the positive third lens group arranged in this order from the most-magnification side,
wherein the negative first lens group, the positive second lens group, and the positive third lens group independently move as moving groups while changing magnification, and
wherein the negative first lens group moves toward the most-reduction side, and the positive second lens group and the positive third lens group move toward the most-magnification side while changing magnification from the wide angle end to the telephoto end.

8. The projection zoom lens of claim 2, wherein the projection zoom lens consists of:
the lens group on the most-magnification side as a negative first lens group;
a positive second lens group; and
the lens group on the most-reduction side as a positive third lens group,
the negative first lens group, the positive second lens group, and the positive third lens group arranged in this order from the most-magnification side,
wherein the negative first lens group, the positive second lens group, and the positive third lens group independently move as moving groups while changing magnification, and
wherein the negative first lens group moves toward the most-reduction side, and the positive second lens group and the positive third lens group move toward the most-magnification side while changing magnification from the wide angle end to the telephoto end.

9. The projection zoom lens of claim 1, wherein the projection zoom lens consists of:
the lens group on the most-magnification side as a negative first lens group;
a positive second lens group;
a positive third lens group; and
the lens group on the most-reduction side as a positive fourth lens group,
the negative first lens group, the positive second lens group, the positive third lens group, and the positive fourth lens group arranged in this order from the most-magnification side,
wherein the negative first lens group, the positive second lens group, the positive third lens group, and the positive fourth group individually move as moving groups while changing magnification, and
wherein the negative first lens group moves toward the most-reduction side, and the positive second lens group, the positive third lens group, and the positive fourth lens group move toward the most-magnification side while changing magnification from the wide angle end to the telephoto end.

10. The projection zoom lens of claim 2, wherein the projection zoom lens consists of:
the lens group on the most-magnification side as a negative first lens group;
a positive second lens group;
a positive third lens group; and
the lens group on the most-reduction side as a positive fourth lens group,
the negative first lens group, the positive second lens group, the positive third lens group, and the positive fourth lens group arranged in this order from the most-magnification side,
wherein the negative first lens group, the positive second lens group, the positive third lens group, and the positive fourth group individually move as moving groups while changing magnification, and
wherein the negative first lens group moves toward the most-reduction side, and the positive second lens group, the positive third lens group, and the positive fourth lens group move toward the most-magnification side while changing magnification from the wide angle end to the telephoto end.

11. The projection zoom lens of claim 9, wherein the positive second lens group consists of one single lens.

12. The projection zoom lens of claim 10, wherein the positive second lens group consists of one single lens.

13. The projection zoom lens of claim 9, wherein the positive third lens group consists of one single lens.

14. The projection zoom lens of claim 10, wherein the positive third lens group consists of one single lens.

15. The projection zoom lens of claim 11, wherein the positive third lens group consists of one single lens.

16. The projection zoom lens of claim 1, wherein conditional formula (3) below is satisfied:

$$1.0 < Bfw/fw \quad (3),$$

where
fw: the focal length of the entire system at the wide angle end, and
Bfw: the back focus of the entire system at the wide angle end, which is expressed by an air converted length.

17. The projection zoom lens of claim 2, wherein conditional formula (3) below is satisfied:

$$1.0 < Bfw/fw \quad (3),$$

where
fw: the focal length of the entire system at the wide angle end, and
Bfw: the back focus of the entire system at the wide angle end, which is expressed by an air converted length.

18. The projection zoom lens of claim 1, wherein a maximum height of effective rays at a lens surface of the most-reduction side is smaller than a maximum image height on the most-reduction side.

19. The projection zoom lens of claim 2, wherein a maximum height of effective rays at a lens surface of the most-reduction side is smaller than a maximum image height on the most-reduction side.

20. A projection type display device comprising
a light source;
a light valve;
an illumination optical unit which guides a light beam from the light source to the light valve; and
the projection zoom lens of claim 1;
wherein the light beam from the light source is optically modulated by the light valve and is projected onto a screen by the projection zoom lens.

* * * * *